United States Patent
Seki

(12) 
(10) Patent No.: US 6,336,151 B1
(45) Date of Patent: Jan. 1, 2002

(54) SYSTEM FOR CONTROLLING AN EXTERNAL DEVICE CONNECTED THROUGH A PERIPHERAL DEVICE BY PROVIDING A PROGRAM FORMED BY COMBINATION OF THE PERIPHERAL DEVICE AND THE EXTERNAL DEVICE TO A HOST SYSTEM

(75) Inventor: Taro Seki, Saitama (JP)

(73) Assignee: Fuji Xerox Co., LTD, Tokyo (JP)

( * ) Notice: Subject to any disclaimer, the term of this patent is extended or adjusted under 35 U.S.C. 154(b) by 0 days.

(21) Appl. No.: 09/227,571

(22) Filed: Jan. 8, 1999

(30) Foreign Application Priority Data

Jan. 9, 1998 (JP) ............................................ 10-013537

(51) Int. Cl.[7] ............................. G06F 3/00; G06F 13/28
(52) U.S. Cl. ................................. 710/8; 710/10; 710/64; 709/217
(58) Field of Search .......................... 710/8–10, 62–64; 709/200, 217; 711/1, 100

(56) References Cited

U.S. PATENT DOCUMENTS

| | | | |
|---|---|---|---|
| 4,815,034 A | * | 3/1989 | Mackey ........................ 710/64 |
| 5,404,494 A | * | 4/1995 | Garney ........................ 709/300 |
| 6,009,480 A | * | 12/1999 | Pleso ............................. 710/8 |
| 6,092,105 A | * | 7/2000 | Goldman .................... 709/217 |

FOREIGN PATENT DOCUMENTS

| | | |
|---|---|---|
| EP | 0718776 A2 * | 6/1996 |
| JP | 9-93383 | 4/1997 |
| JP | 11102296 A * | 4/1999 |

* cited by examiner

Primary Examiner—Thomas Lee
Assistant Examiner—Thuan Du
(74) Attorney, Agent, or Firm—Finnegan, Henderson, Farabow, Garrett & Dunner, L.L.P.

(57) ABSTRACT

An electronic device has a connected device detection mechanism and receives a machine name from a peripheral device connected to the electronic device. If a program (or driver) corresponding to the machine name is not installed in the electronic device, the electronic device makes a request for installing the program. In a case where an external device is further connected to the peripheral device to thereby extend the features of the peripheral device, a hybrid machine name formed by combination of the peripheral device and the external device is acquired, and a program corresponding to the hybrid machine name is installed. If the features of the peripheral device are changed even though the peripheral device is identical, a corresponding program is installed without requiring that the user have special knowledge.

12 Claims, 13 Drawing Sheets

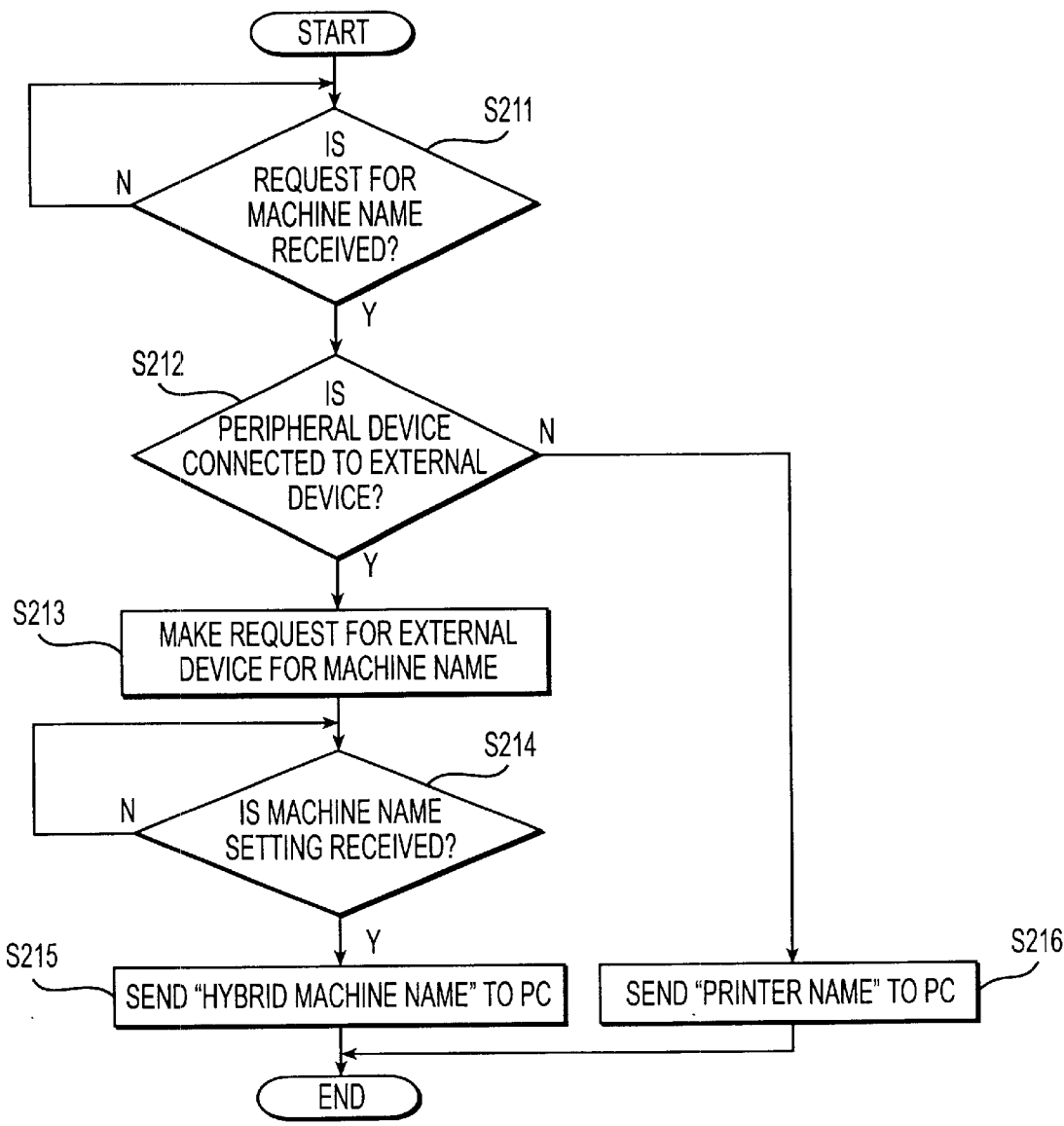

SYSTEM FOR CONTROLLING AN EXTERNAL DEVICE CONNECTED THROUGH A PERIPHERAL DEVICE BY PROVIDING A PROGRAM FORMED BY COMBINATION OF THE PERIPHERAL DEVICE AND THE EXTERNAL DEVICE TO A HOST SYSTEM

BACKGROUND OF THE INVENTION

The present invention relates to an electronic device extension system suitable for extending or modifying the feature of a peripheral device, such as a printer, connected to an electronic device, such as a computer.

There often occurs a great leap forward in development of a peripheral device such as a printer which is used while being connected with a personal computer. For example, the software required for driving a printer is upgraded to a higher version within a short period of time together with an improvement in the features of the printer, or the software of a peripheral device, such as a printer, which has been used and connected with a computer must be upgraded at frequent intervals in association with the revision or changing of basic software (i.e., disk operating system) of the computer per se. Conventionally, every time the software of the peripheral device is changed, a floppy disk storing the software is delivered from the manufacturer of the peripheral device, and the software is installed into the computer through use of the floppy disk.

With regard to the electronic device extension system, the following expressions are consistently used throughout the specification.

ELECTRONIC DEVICE: one which is typified by a computer and which permits connection to a peripheral device such as that which will be described below;

PERIPHERAL DEVICE: one which is typified by a printer, is connected to electronic equipment, and permits connection to an external device such as that which win be described below, as necessary: and EXTERNAL CONNECTED DEVICE: one which is typified by a facsimile unit for fulfilling a facsimile transmission feature and which is connected to a peripheral device and extends features thereof.

Recently, there have been cases where an advanced driver stored in a compact disk which is included with a published magazine is decompressed, and an upto-date driver is installed into the computer through use of the driver, or cases where a target driver is downloaded from the homepage of the manufacturer via the Internet. These conventional methods require much time and effort to install software, and frequently result in failures to improve the features of the peripheral devices at required timing. More specifically, in the event of a problem occurring, the most recent software is often installed in order to solve the problem.

To solve such problems, Unexamined Japanese Patent Publication No. Hei 9-93383 discloses the technology of causing a modem (modulator/demodulator) connected to a personal computer to automatically originate a call to a specifically addressed data processor over a telephone network when the modem receives an update instruction from the computer, whereby a required driver is downloaded from the data processor. This technology enables updating of the driver of the printer connected to the computer or the facsimile transmission feature of the computer using the modem, whenever necessary.

Further, what is called a plug-and-play concept, as typified by Microsoft Windows 95, has recently emerged in the field of computer operating systems. Under this concept, the computer recognizes peripheral devices connected thereto and automatically installs the software required by the peripheral devices.

The technique proposed in the above publication has the advantage of the ability to improve, or to delete problems of, the feature of a peripheral device, such as a printer, and the feature of an electronic device, such as a computer, without use of a medium for software installation purpose, such as a floppy disk. However, this technique suffers a problem of software to be upgraded being limited solely to software to which the computer has issued a data upgrade instruction. More specifically, the software that can be upgraded is limited solely to software related to the devices, such as a printer and a facsimile machine, recognized by the computer.

The plug-and-play concept is also imperfect. Under the concept, the computer identifies a peripheral device to be connected to the computer and determines software to be installed solely based on the result of such identification name. Consequently, during hardware detection, the computer may erroneously recognize as specific peripheral devices a plurality of peripheral devices that use similar circuits, In such a case, even if an attempt is made to install software corresponding to the peripheral device connected to the computer after hardware detection, the computer will deny installation of the software on grounds that the software is not software to be used for upgrading the erroneously-recognized hardware In such a case, laborious procedures are needed; namely, software is first installed to the computer while the peripheral device is disconnected from the computer, and the peripheral device is connected to the computer after the computer has recognized the peripheral device.

FIG. 20 is a block diagram for explaining another example of a problem which differs from the foregoing problem and arises when a computer is connected with a plug-and-play-capable peripheral device correctly recognized by the computer. In the diagram, a computer 11 is connected to a printer 12, which is a peripheral device capable of being recognized by the computer 11. In this case, upon detection of the printer 12, the computer 11 installs up-to-date software for the printer 12. In this respect, there are no problems.

If the printer 12 shown in FIG. 20 is a peripheral device having a comparatively great potential for extension, the owner of the printer 12 can add to the printer 12 a sorter 13 for sorting printed sheets or an image reader 14 for fulfilling a copying function. Thus, while the printer 12 is left as is, accessories (or external devices) can be attached to the printer 12, thus enabling extension of the features of the printer 12. In association with addition of accessories, the software of the printer 12 must be revised in order to fulfill these new features. However, when the printer 12 is viewed from the computer 11, no change arises in hardware. For this reason, the computer 11 detects the printer 12 as remaining unchanged and sets the software for the printer in the same manner as done before. Consequently, if the features of the peripheral device are substantially extended, the thus-extended feature cannot be utilized.

Conventionally, as in the case with the previous example, software compatible with extended features is first installed in the computer. Next, the peripheral device, such as the printer 12, is connected to the computer 11. At this time, however, the latest driver software for the printer 12 and the thus installed software concurrently exist in the computer 11. Installation of additional software, such as a driver, to the computer results in worsening of instability of the operating system. Further, if the operating system of the computer is reinstalled for any reasons or the operating system is upgraded, the software that has been installed for extending the features of the peripheral device in the past is deleted, thus disabling the extended feature of the peripheral device, In this case, there is no alternative but for the operator to recall the special procedures required for installing the software the previous time and to perform the procedures again. Thus, the operator is forced to assume an excessive burden.

SUMMARY OF THE INVENTION

It is therefore the object of the present invention is to provide an electronic device extension system which permits easy extension or modification of the features of a peripheral device connected to an electronic device such as a computer.

In order to achieve the above object, there is provided an electronic device extension system comprising: an electronic device; a peripheral device connected to the electronic device; storage means provided in the electronic device for storing a program required at the time of connection of the peripheral device; device connection means provided in the electronic device for connecting the peripheral device thereto; identification name acquisition means provided in the electronic device for acquiring an identification name corresponding to the function of the peripheral device from the peripheral device via the device connection means; determination means provided in the electronic device for determining whether a program corresponding to the identification name acquired by the identification name acquisition means is stored in the storage means; program storage means provided in the electronic device for storing the program when the determination means determines that the corresponding program is unstored in the storage means; connection means provided in the peripheral device for connecting with the device connection means of the electronic device; and identification name notification means provided in the peripheral device and connected to the electronic device through the connection means for notifying the electronic device of an identification name corresponding to the feature of the peripheral device.

Thus, according to the present invention, an electronic device extension system comprises an electronic device, such as a computer, and a peripheral device connected therewith. The electronic device comprises storage means for storing a program required for starting a peripheral device when the peripheral device is connected to the electronic device; device connection means for connecting a peripheral device to the electronic device; identification name acquisition means for acquiring an identification name corresponding to the feature of the peripheral device to be connected to the electronic device, from the peripheral device connected to the electronic device; determination means for determining whether or not a program corresponding to the identification name acquired by the identification name acquisition means is stored in the storage means, and program storage means for storing the program when the determination means determines that the corresponding program is not stored in the storage means. If the features of the peripheral device are changed or extended, the peripheral device is assigned an identification name corresponding to the thus-changed/extended features, whereby a program corresponding to the identification name is installed in the electronic device.

Further, according to the present invention, the peripheral device notifies to the electronic device an identification name corresponding to the features of the peripheral device after having been connected to the electronic device, Accordingly, for example, if the electronic device can recognize only a so-called plug-and-play-capable peripheral device and is aware of only an identification name corresponding to the original features of the peripheral device, the electronic device cannot recognize a new identification name corresponding to extended features of the peripheral device when the peripheral device is connected with an external device in order to extend the features of the peripheral device. As a matter of course, a program corresponding to the new identification name has not yet been installed in the electronic device. In such a case, the peripheral device whose features are extended can be started without a hitch by storing a program corresponding to the new identification name into the electronic device while the new identification name is taken as a key.

In order to achieve the object, there is also provided an electronic device extension system comprising: an electronic device; a peripheral device connected to the electronic device; at least one external device capable of connecting to the peripheral device for extending the feature of the peripheral device; storage means provided in the electronic device for storing a program required at the time of connection of the peripheral device; device connection means provided in the electronic device for connecting the peripheral device thereto; identification name acquisition means provided in the electronic device for acquiring an identification name corresponding to the function of the peripheral device from the peripheral device via the device connection means; determination means provided in the electronic device for determining whether a program corresponding to the identification name acquired by the identification name acquisition means is stored in the storage means; program storage means provided in the electronic device for storing the program when the determination means determines that the corresponding program is unstored in the storage means; connection means provided in the peripheral device for connecting with the device connection means of the electronic device; feature extension connection means provided in the peripheral device for connecting with the external device; identification name setting means provided in the peripheral device for setting an identification name in response to the connection of the external device; and identification name notification means provided in the peripheral device and connected to the electronic device through the connection means for notifying the electronic device of an identification name corresponding to the feature of the peripheral device.

Thus, according to the present invention, the electronic device extension system comprises an electronic device, such as a computer; a peripheral device connected to the electronic device; and an external device connected to the peripheral device, as needed. For example, when the electronic device sends a request for identification name to the peripheral device or when the peripheral device is connected to the electronic device, the peripheral device voluntarily sets an identification name in response to a device connected to the peripheral device and informs the electronic device of the thus-set identification name. If a program corresponding to the received identification name is not stored in the electronic device, the electronic device stores the program to thereby control the external device connected to the peripheral device.

The identification name setting means includes current identification name storage means for storing an original identification name of the peripheral device when the external device is disconnected, and for storing a hybrid identification name corresponding to the extended feature of the peripheral device when the external device is connected thereto.

Thus, the electronic extension system is further provided with the current identification name storage means that changes the original identification name of the feature extension connection means to a hybrid identification name corresponding to the feature of the feature extension connection means extended as a result of an external device being connected, as a device for feature extension purpose, to the feature extension connection means, stores the thus-changed hybrid identification name, and reassumes the original identification name when the external device is not connected to the feature extension connection means.

Consequently, if an external device is newly connected to the peripheral device, the connection of the peripheral device is changed, or the external device is disconnected from the peripheral device to thereby bring the peripheral device into its original configuration, the identification name of the peripheral device may be changed to another identification name corresponding to the change. When the electronic device requests the peripheral device to send its identification name, the peripheral device notifies the electronic device of the currently-set identification name.

The electronic device extension system further comprises: disconnection notice input means for inputting notice data to notice a disconnection previously when at least one of the disconnection of the peripheral device from the electronic device and the disconnection of the external device from the peripheral device is executed; and setting information storage means for storing setting information of the peripheral device and the external device in one of the electronic device, the peripheral device and the external device when the notice data is input by the disconnection notice input means.

Thus, it is directed to disconnection of the peripheral device from the electronic device, Before disconnection of the peripheral device from the electronic device or the external device from the peripheral device, an previous notice of disconnection is issued. The electronic device stores the setting information regarding the peripheral device or the external device into the electronic device, the peripheral device, or the external device. For example, when the external device is a facsimile unit having a facsimile transmission function, several settings, such as phone numbers of called parties and groups of called parties related to broadcast transmission, are stored in the facsimile unit. The facsimile unit may be connected again to the peripheral device as an external device, or the peripheral device having the facsimile unit connected thereto may be connected again to the electronic device. When the peripheral device is disconnected from the electronic device, the setting information regarding the peripheral device is stored in the electronic device, the peripheral device, or the external device, thus avoiding the labor, which would otherwise be required for setting the information again at the time of connection of the once-removed device.

The electronic device extension system further comprises: storage address inquiry means for making an inquiry about a location where the setting information is stored by the setting information storage means; and storage address designation means for storing the setting information in response to an answer to the inquiry from the storage address inquiry means.

Thus, an inquiry about the location where the setting information is stored is sent to the user, and the setting information is stored in the most convenient location. As a matter of course, depending on an electronic device extension system, the location where setting information is to be stored may be specified beforehand, and the setting information may be stored without involvement of the user.

The electronic device extension system further comprises: unneeded program elimination means for deleting the program regarding only the peripheral device and the external device stored in the storage means of the electronic device in accordance with the storing operation by the setting information storage means.

Thus, according to the sixth aspect of the present invention, when the peripheral device is disconnected from the electronic device, a unique program prepared for use with the peripheral device or the external device connected to the peripheral device is deleted from the electronic device, In consideration of the case where the peripheral device or the external device thus disconnected may be connected to the electronic device or the peripheral device again, desirably the program is stored in the electronic device. However, indiscriminate coexistence of such programs in the electronic device may cause a failure which in turn hinders execution of another program. When the peripheral device is connected to the electronic device at a future time, a corresponding program can be readily installed on the basis of the identification name of the peripheral device. Therefore, such an unneeded program is deleted from the electronic device, The electronic device extension system further comprises: designated program elimination disable means for excluding from programs which are to be deleted by the unneeded program disconnection means a program for implementing the original feature of the peripheral device when the peripheral device is a device designated previously.

The electronic device is based on the assumption that it is originally designed to be connected with some of the peripheral devices which are commonly connected to the electronic device. Further, the electronic device is assumed to prepare a program required for connecting the peripheral device to the electronic device. It is directed to preventing elimination of such a program at the time of disconnection of the peripheral device. In many cases, such a program is intended to coexist with other programs from the beginning, and there are few instances in which elimination of the program is inevitable. In the case of the peripheral device assumed to be connected to the electronic device, there is a considerable chance of re-connection of the peripheral device to the electronic device. For this reason, storing the program into the electronic device yields a great advantage.

The electronic device extension system further comprises: file collation means for collating files of a program to be installed in the electronic device with the files installed in the electronic device when one of the connection of the peripheral device to the electronic device and the connection of the external device to the peripheral device is executed; and file installation means for installing into the electronic device only files being out of accord concluded by the collation.

It is directed to a case where a new program must be installed into the electronic device as a result of the peripheral device being connected to the electronic device or the external device being connected to the peripheral device. Even in this case, some of the files constituting the program to be installed are commonly used among other devices. If these files are installed in an overlapping manner, the same files coexist within the electronic device, thus resulting in wastage of resources. To prevent such a waste, files constituting the program to be installed in the electronic device are collated with the files that are already installed in the electronic device. Only those files whose corresponding files are not found are installed in the electronic device, thereby shortening the time and the storage capacity required for installing the program.

BRIEF DESCRIPTION OF THE DRAWINGS

In the accompanying drawings:

FIG. 13 is a chart showing the configuration of the setting record section of a facsimile unit according to the second embodiment;

FIG. 14 is a flowchart showing processing performed by the printer when a request for machine name is made;

DETAILED DESCRIPTION OF THE PREFERRED EMBODIMENTS

The present invention will be described in detail by reference to preferred embodiments thereof.

Figure 1:
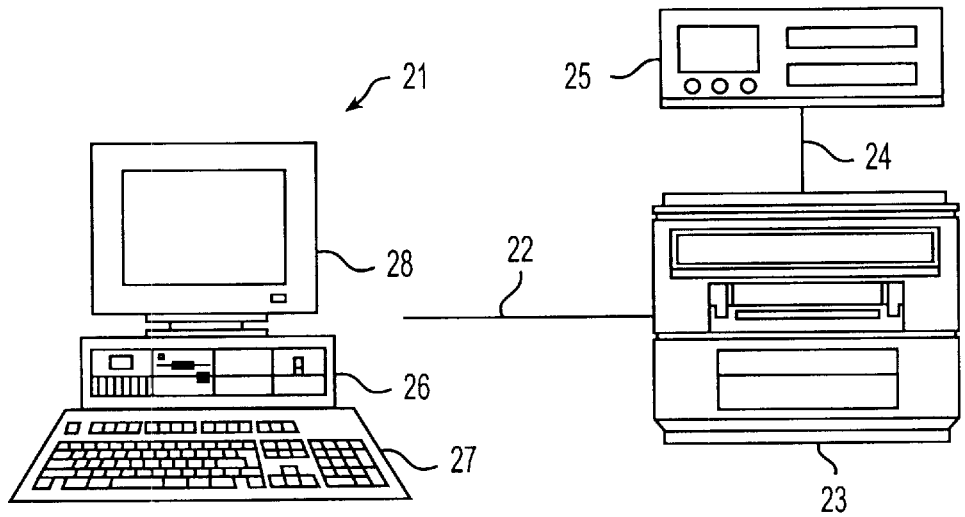
FIG. 1 is a schematic diagram showing the entire architecture of an electronic device extension system according to one embodiment of the present invention.

FIG. 1 shows the entire architecture of an electronic device extension system according to one embodiment of the present invention. The system according to the present embodiment comprises a personal computer 21 (hereinafter referred to simply as a "computer") serving as an information processing terminal; a printer 23 which serves as a peripheral device connected to the personal computer 21 by way of a connection cable 22; and a facsimile unit 25 which serves as an external device for feature extension purpose connected to the printer 23 by way of an extension cable 24. The computer 21 comprises a general-purpose computer main unit 26, an input device such as a keyboard 27 connected to the computer main unit 26, and a CRT display 28 connected to the computer main unit 26. The facsimile unit 25 adds to the original printing capability image reading capability and the capability of transmitting and receiving image data. The received image data can be printed by means of the original printing capability of the printer 23. By utilization of the printing capability of the printer 23 and the image reading capability, there can also be implemented the capability of copying an original and so-called computer facsimile (PC FAX) capability of acquiring the data received by the facsimile unit into the electronic device and transmitting the data prepared by the electronic device by way of the facsimile unit without printing the data.

Figure 2:
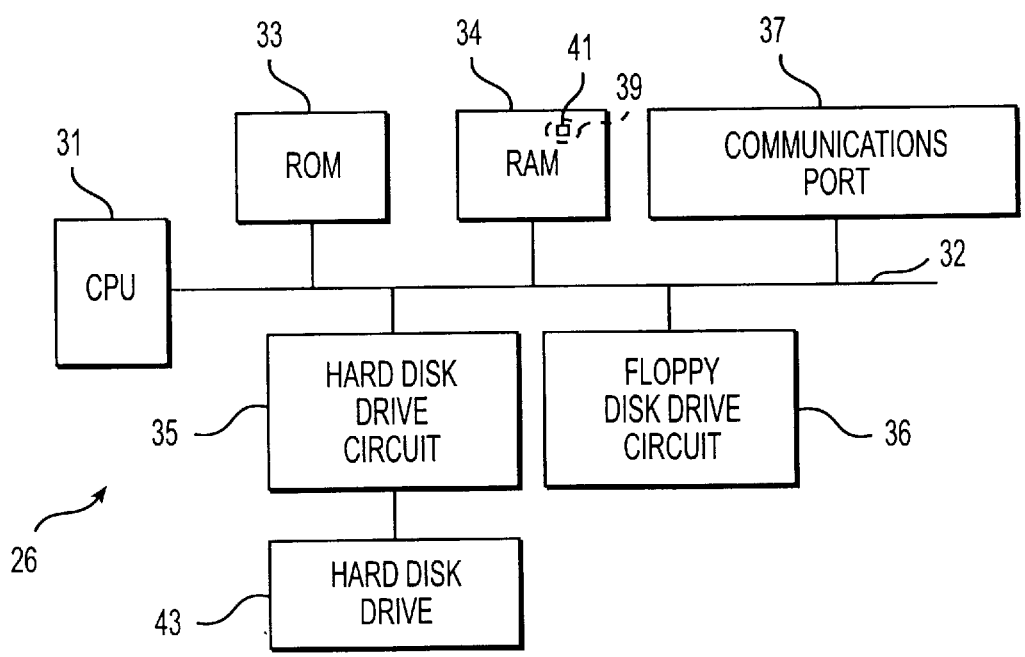
FIG. 2 is a block diagram showing the outline of configuration of a computer main unit according to the embodiment.

FIG. 2 shows the outline of configuration of the computer. The computer main unit 26 comprises a CPU 31 (central processing unit) serving as control center. The CPU 31 is connected to circuit components, that is, ROM 33, RAM 34, a hard disk drive circuit 35, a floppy disk drive circuit 36, and a communication port 37 by way of a bus 32 such as a data bus. The ROM 33 is read only memory in which are stored basic operation procedures, such as procedures for booting the computer main unit 26. The RAM 34 is random access memory for storing data to be used for various operations. A portion of the RAM 34 constitutes a nonvolatile memory location 39 backed up by an unillustrated battery. A connection device name storage section 41 is assigned to a portion of the nonvolatile memory location 39 The name of the facsimile unit 25 serving as a device connected to the peripheral device is stored in the connection device name storage section 41.

A hard disk drive 43 is connected as an external storage medium to the hard disk drive circuit 35, and data can be input to and output from the hard disk drive 43. An unillustrated floppy disk is set in the floppy disk drive circuit 36. As previously mentioned, when new software is installed, in many cases a floppy disk having a program prepared for installation purposes stored therein is used. As a matter of course, although not illustrated in the drawings, a drive circuit for driving another storage medium, such as a CD drive circuit or an MO drive circuit, may be freely connected to the bus 32. Even in such a case, so long as a program is stored in a storage medium, such as a compact disk or a magnetooptical disk, the electronic device such as the peripheral device 23 may be reset through use of the program. In the present embodiment, an unillustrated set-up disk used for installing software is set in the floppy disk drive circuit 36, thereby installing into the electronic device extended features, which would be available when the facsimile unit 25 is connected to the printer 23. Further, the required name of the connected device is registered in the connection device name storage section 41.

Figure 3:
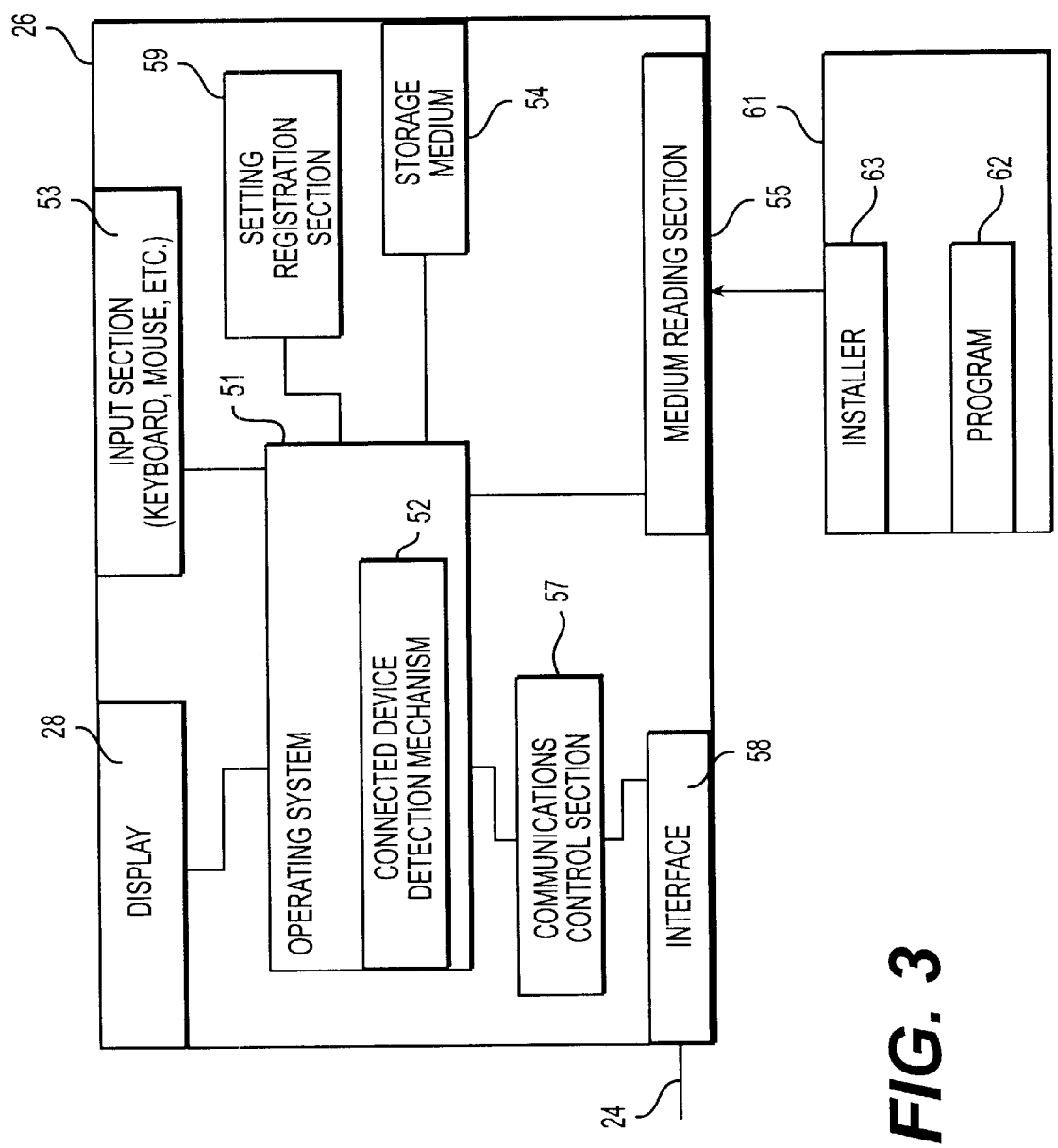
FIG. 3 is a block diagram showing the fundamental configuration of a computer and a setup disk according to the embodiment.

FIG. 3 shows the fundamental configuration of the computer and the set-up disk according to the present embodiment. The computer 21 comprises the CPU (central processing unit) 31 shown in FIG. 2 and an operating system 51 which is implemented through cooperation between the hard disk drive 43 and the RAM 34 for storing software. Via software, the operating system 51 implements a connection detection mechanism 52 with respect to the external devices connected to the extension cable 24. Further, the operating system 51 is connected to a CRT display 28 (shown in FIG. 1), an input device 53 typified by the keyboard 27 (shown in FIG. 1) or a mouse, a storage medium 54 such as the hard disk drive 43 (shown in FIG. 1), and a medium reading section 55 such as the floppy disk drive circuit 36 (shown in FIG, 1). Moreover, the operating system 51 is connected to an interface section 58 by way of a communications control section 57. One end of the extension cable 24 is connected to the interface section 58, and the other end of the same is connected to the facsimile unit 25 shown in FIG. 1. The connection detection mechanism 52 determines the presence/absence of an external device or determines the type of an external device when the external device is detected. The result of such determination is registered in the connection device name storage section 41 shown in FIG. 2 by means of a setting registration section 59.

A set-up disk 61 is inserted into the medium reading section 55, and software required at the time of connection of an external device to the peripheral device can be installed in the computer. The setup disk 61 can be deemed to comprise a program section 62 in which is stored a program to be set up and an installer section 63 for installing the program.

Figure 4:
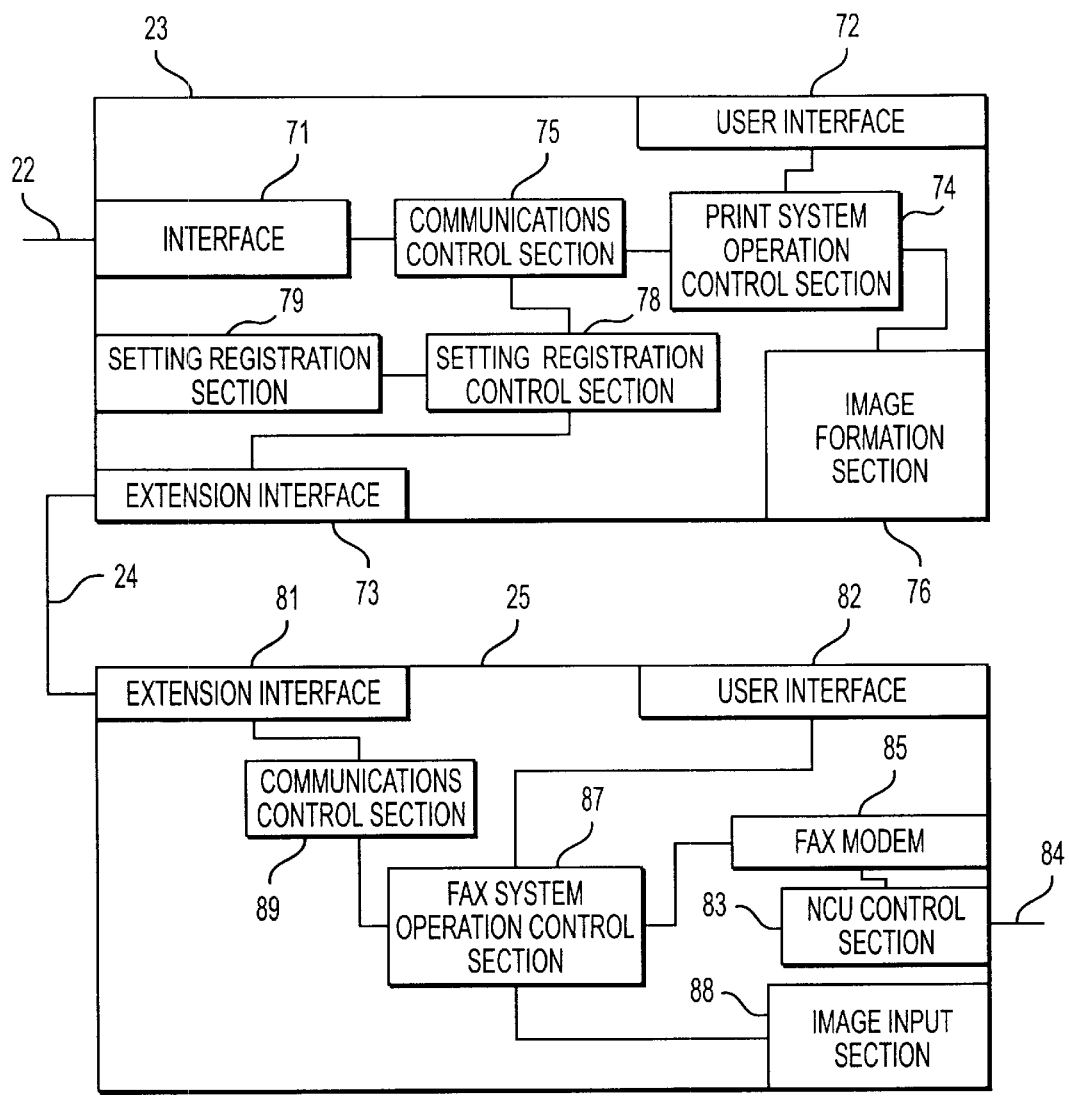
FIG. 4 a block diagram showing the fundamental configuration of a printer and a facsimile unit according to the embodiment.

FIG. 4 shows the fundamental configuration of the printer and the facsimile unit according to the present embodiment. Each of the printer 23 and the facsimile unit 25 comprises an individual CPU (not shown), as in the case of the computer main unit 26 shown in FIG. 2. Further, each of the printer 23 and the facsimile unit 25 comprises ROM, RAM, a communications port, and other required circuit sections (none of which is shown in the drawings) analogous to the ROM 33, the RAM 34, and the communications port 37 (all of which are shown in FIG. 2). Control programs of the printer 23 and the facsimile unit 25 are smaller in size than that of the computer main unit 26, and hence the programs are stored in ROM. No external storage medium, such as a hard disk drive unit, is used for storing the programs. RAM is used as work memory for temporarily storing data such as image data and for processing the thus-stored data. FIG. 4 shows a functional circuit configuration implemented by combination of such hardware and a program.

The printer 23 shown in FIG. 4 comprises an interface connected to the computer 21 shown in FIG. 1 by way of the connection cable 22, and an unillustrated control panel. Further, the printer 23 comprises a user interface 72 for providing the interface between the printer 23 and the user, and an extension interface 73 for interfacing an external device for feature extension purpose with the printer 23 by way of the extension cable 24. A print system operation control section 74 serves as the center of controlling of operations of the printer 23 and is directly connected to the user interface 72. Further, the print system operation control section 74 is connected to the interface 71 by way of a communications control section 75, as well as to an image forming section 76 which expands and records an image for printing purpose. The communications control section 75 is connected to an extension interface 73 and a setting record section 79 by way of a setting registration control section 78 for controlling setting registration of an external device.

The facsimile unit 25 comprises an extension interface 81 connected to the extension cable 24, an unillustrated control panel, and a user interface 81 providing the interface between the facsimile unit 25 and the user. An NCU (network control unit) control section 83 is connected to a telephone line 84 and controls transmission and receipt of a facsimile signal. The fax modem 85 is connected to the NCU control section 83 and modulates/demodulates a signal through use of a physical modem. A fax system operation control section 87 serves as the center of controlling of operations of the facsimile unit 25 and is connected directly to the user interface 82 and the fax modem 85, as well as directly to an image input section 88 made up of a one-dimensional image sensor and a communications control section 89 for controlling communication with the printer 23. The communications control section 89 is connected to the extension interface 81 and transmits/receives required information to and from the communications control section 75 of the printer 23.

Figure 5:
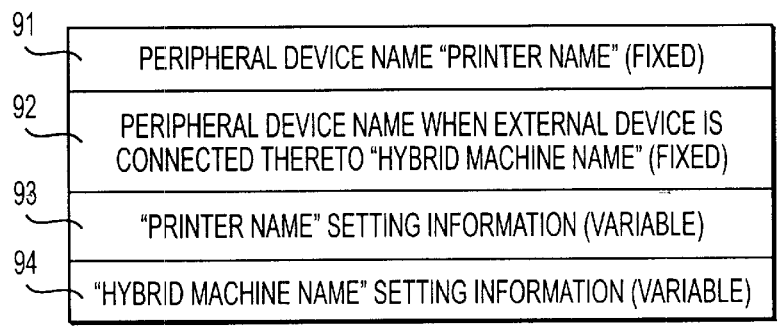
FIG. 5 is a table showing the contents of a setting record section of the printer.

FIG. 5 is a table showing the details of logs stored in a setting record section of the printer 23. The setting record section 79 is formed from the previously-described nonvolatile memory location of the RAM. The setting record section 79 fixedly holds a "printer name" 91 representing the name of the printer 23 and a "hybrid machine name" 92 representing the name of the printer when an external device is connected to the printer 23. Further, the setting record section 79 is arranged so as to be able to hold a "printer name setting information" 93 which can be set by way of a terminal and a "hybrid machine name setting information" 94 which can be set by way of the terminal in the same manner as is the printer name setting information 93 in such a way that the printer name setting information 93 and the hybrid machine name setting information 94 may be changed. In the present embodiment, for the sake of simplifying an explanation of the present invention, the electronic device to which the computer 21 can be connected in an expandable manner is limited solely to the printer 23. Further, the explanation is given on the basis of the assumption that an external device to which the printer 23 can be connected for extension purpose is limited solely to the facsimile unit 25.

Figure 6:
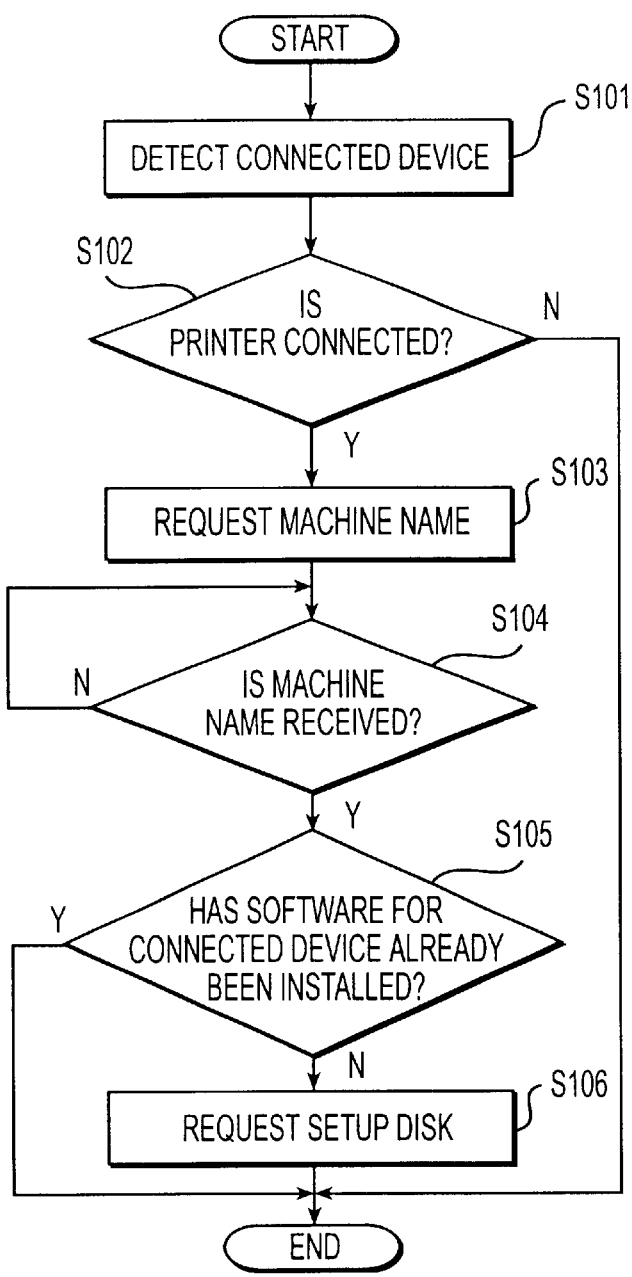
FIG. 6 is a flowchart showing the flow of processing steps from the step in which the computer according to the embodiment detects a connection device to the step in which a request for a setup disk is made.

FIG. 6 shows the flow of operations from the step in which the computer according to the embodiment detects a connection device to the step in which a request for a setup disk is made. The connection detection mechanism 52 (shown in FIG. 3) of the computer 21 shown in FIG. 1 detects connection of a connected device at predetermined timing (step S101). For example, the timing corresponds to a point in time at which the computer 21 is powered; however, the timing is not necessarily limited to such a point in time. The detection operation may be periodically performed while the computer 21 is performing ordinary data processing operations. A determination is made as to whether or not a connection device is connected, through detection of a response from the connection device by way of the interface 58 (shown in FIG. 3). In the present embodiment, the connection device connected to the computer 21 is limited to the printer 23 shown in FIG. 1. Consequently, so long as the connection device is connected to the computer 21, the computer 21 can identify the printer 23 as a peripheral device.

As a result of detection, if the printer 23 turns out not to be connected to the computer 21 (NO in step S102), the detection operation is terminated. A similar detection operation is repeatedly performed at the next detection timing such as a point in time at which the computer 21 is powered. If the printer 23 is detected to be connected to the computer 21 (YES in step S102), the connection detection mechanism 52 requests the thus-detected device to send its name (step S103).

Figure 7:
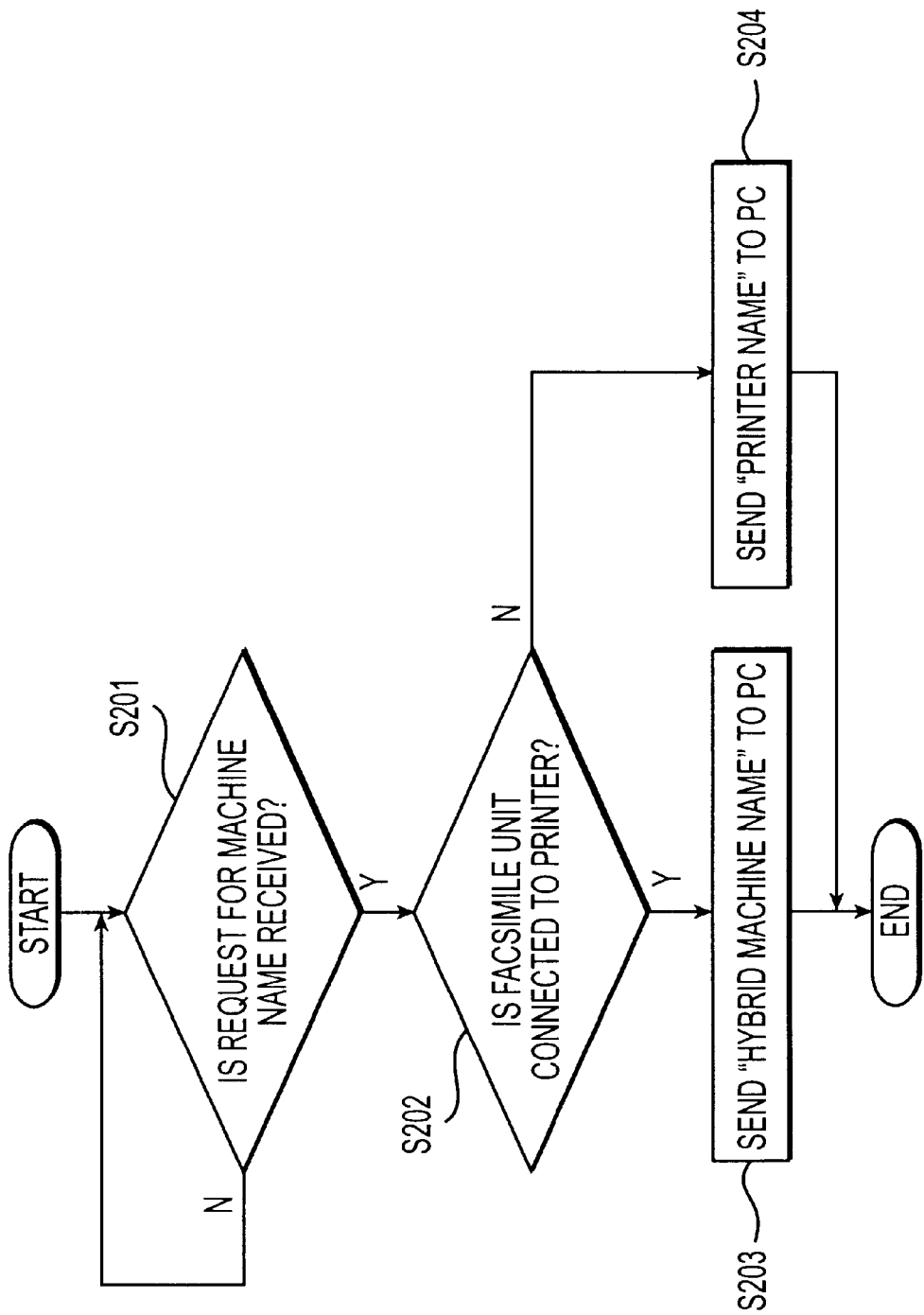
FIG. 7 is a flowchart showing the flow of processing performed by the printer when the request for machine name is issued in the step S103 of FIG. 6.

FIG. 7 shows the processing performed by the printer when the request for machine name is issued. Upon receipt of the machine name request issued in step S103 (YES in step S201), the printer 23 shown in FIG. 1 checks the status of connection of the facsimile unit 25 by way of the extension interface 73 (step S202). When the facsimile unit 25 is connected to the printer 23 (YES), a "hybrid machine name" representing that the "printer" is connected to the "facsimile unit" is transmitted to the computer (PC) 21 (step S203). In contrast, if the facsimile unit 25 is not connected to the printer 23 (NO), a "printer name" representing the original name of the printer 23 is transmitted to the computer 21 (step S204).

Turning again to FIG. 6, the explanation of the flow is resumed. After having issued the request for machine name in step S103, the computer 21 awaits receipt of any machine name (step S104). If the machine name has already been transmitted from the printer 23 (YES), the computer 21 determines whether or not the software of the connected device is already installed (step S105). The determination is made by checking whether or not any one of the names that are registered in the connection device name storage section 41 (shown in FIG. 2) by the setting registration section 59 (shown in FIG. 3) matches the "printer name" or the "hybrid machine name" received from the connected device. If there is a match, the device of that name had been detected in the past, and the software for that device has already been installed. Accordingly, the processing is terminated without a new request for installation being made (END).

If none of the names registered in the connection device name storage section 41 match the "printer name" or "hybrid machine name" received by the computer 21, the software corresponding to the received name must be set in the computer 21 (NO in step S105). To this end, the operating system 51 makes a request to the CRT display 28 for a setup disk (step S106). The operator inserts the setup disk 61, which has been described by reference to FIG. 3, into the medium reading section 55. As will be described below, insertion of the setup disk 61 into the medium reading section 55 does not mean installation of the software from the setup disk 61 in a straightforward manner, because the software may have already been installed into the computer 21.

Figure 8:
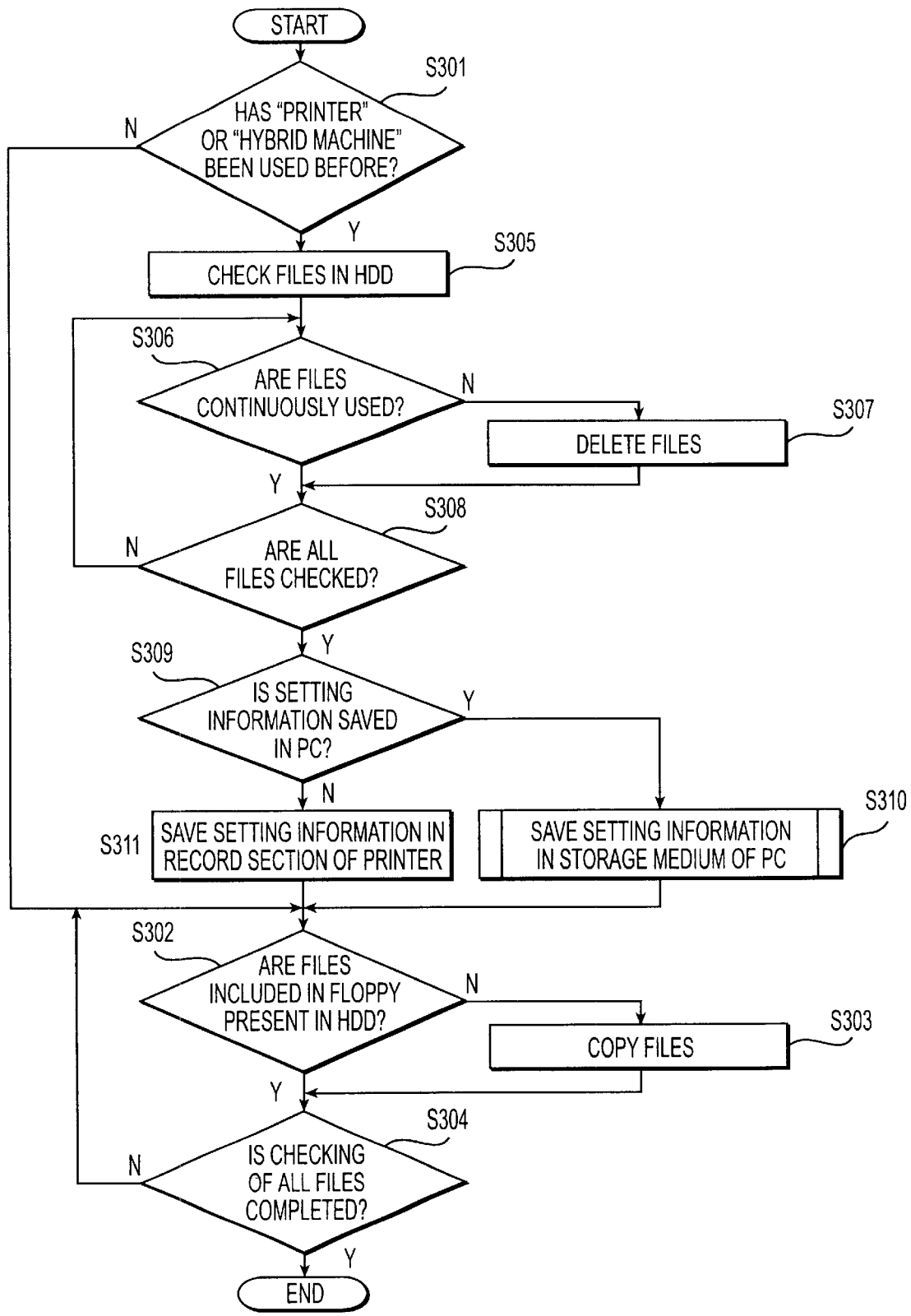
FIG. 8 is a flowchart showing the flow of processing following the step in which the setup disk is inserted into the medium reading section and is detected by the computer.

FIG. 8 shows the flow of processing following the step in which the setup disk is inserted into the medium reading section and is detected by the computer 21. Upon detection of insertion of the setup disk 61 into the medium reading section 55, the printer 21 checks the data registered in the setting registration section 59 (shown in FIG, 3) in the past and checks whether or not the "printer name" or "hybrid machine name" has been used in the past (step S301). If the "printer name" or "hybrid machine name" had not been used (NO), the computer 21 checks whether or not a setup file corresponding to the software stored in the setup disk 61 already exists in the hard disk drive (HDD) 43 (shown in FIG. 2) (step S302). Even if the "printer name" or "hybrid machine name" has never appeared in the electronic device extension system before now, the installation file corresponding to the "printer name" or "hybrid machine name" may be identical with a part of a plurality of component files pre-installed in the operating system as drivers. Since the file has already been installed in the electronic device, copying of the same file can be omitted.

The determination as to whether or not the same file exists in the operating system is made by sequentially referring to the files stored in the setup disk 61. More specifically, the first file of the setup disk 61 is compared with a group of files stored in the hard disk drive 43. If no files match the first file (NO in step S302), the first file is copied to the hard disk drive 43 from the setup disk 61 (step S303). Subsequently, a determination is made as to whether or not all the files stored in the setup disk 61 have been checked (step S304). If the checking of the files has not yet been completed (NO), the processing returns to step S302 and a check is made as to whether or not the next file exists in the hard disk 43. In this way, the processing will be terminated at a point in time all the files stored in the setup disk 61 are copied to the hard disk drive 43 (END).

In contrast, if a determination is made that the "printer name" or "hybrid machine name" had been used in the past (YES), the setup component files stored in the hard disk drive 48 are respectively checked (step S305). The electronic device extension system according to the present embodiment employs the policy of eliminating unneeded files from the hard disk drive 43 and preventing files from being resident in memory in order to make the operations of the computer 21 as stable as possible. As is normally the case, some of the files existing in the hard disk drive 43 can be used for the current "printer name" or "hybrid machine name." Installation of the same files into the disk drive 43 results in a problem, as mentioned previously. To prevent the problem, the files are checked one by one as to whether or not they can be continuously used for a new "printer name" or "hybrid machine name" (step S306). As a result, files which do not correspond to the miles that can be continuously used are deleted (step S307). In contrast, the files that can be continuously used are not deleted. In this way, the files having a chance of being continuously used within the hard disk drive 43 are checked one by one (step S306).

When the relevant files in the hard disk drive 43 have become identical with the files designated to be installed by the installer 63 of the setup disk 61, the setting file stored in the computer 21 as a machine name until the previous session is temporarily fetched from the corresponding location and is saved. For this reason, the operating system (CPU 31) 51 shown in FIG. 3 indicates on the CRT display 28 an inquiry "Where is the setting information to be saved stored?" to thereby check whether the setting file to be saved is stored in the computer 21 or the printer 23 (step S309).

When the location where the setting information is to be saved is set to the computer 21 (YES), the previous setting information, such as the previous "machine name," is stored in the storage medium 54 (step S310). In contrast, in a case where the setting information is set so as to be stored not in the computer 21 but in the printer 23 (NO in step S309), the setting information is stored in the setting record section 79 (shown in FIG. 4) (step S311), thus completing the processing (END).

Figure 9:
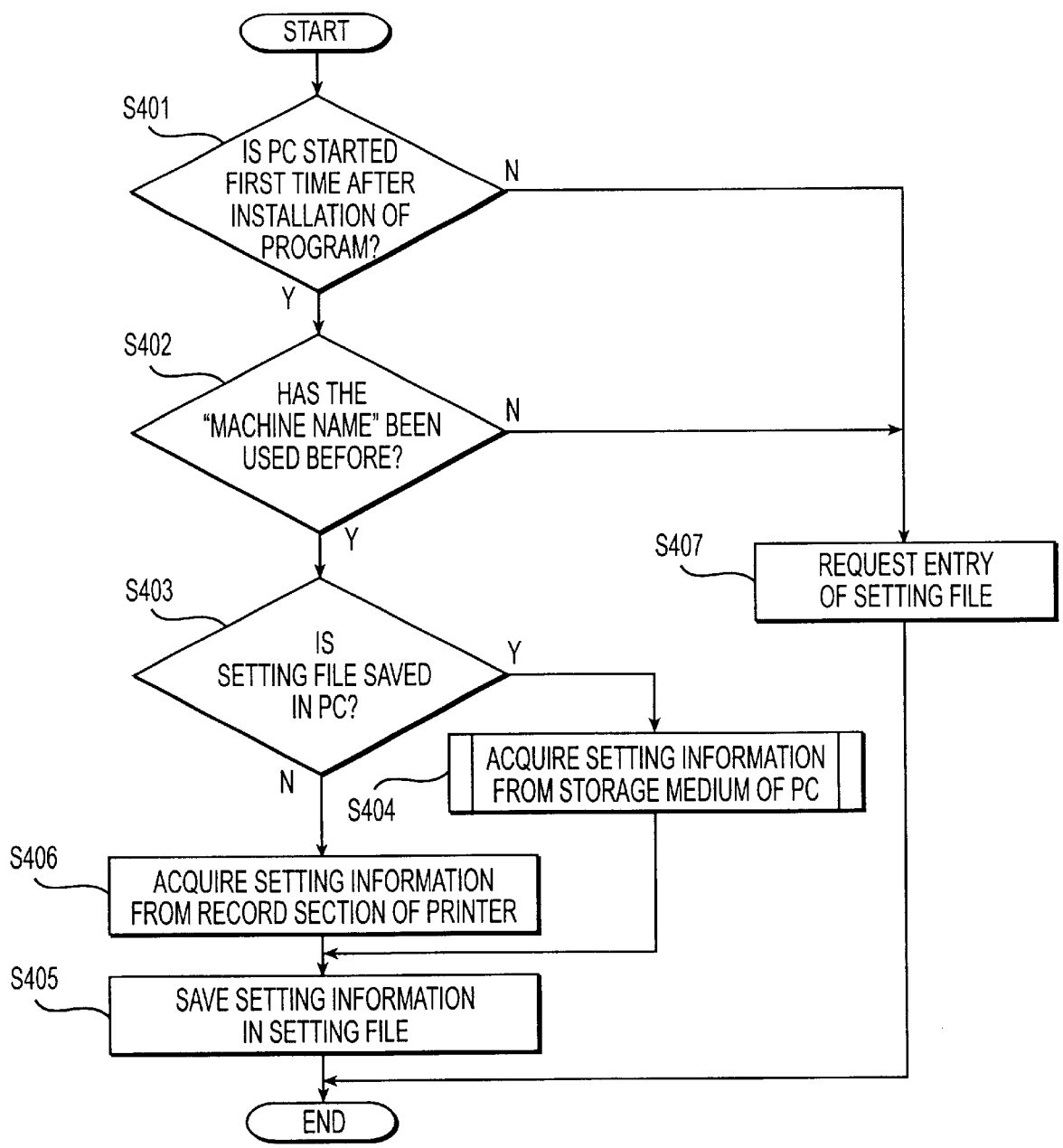
FIG. 9 is a flowchart showing the flow of processing performed in the electronic device extension system according to the present embodiment from a step of starting a program to a step of completing the thus-started program.

FIG. 9 shows the flow of processing performed in the electronic device extension system according to the present embodiment from a step of starting a program to a step of completing execution of the thus-started program. When the program of the printer 23 is started, the computer 21 determines whether or not the printer 23 is booting for first time after installation of the program from the setup disk (step S401). If the computer 21 determines that the boot-up is the first after installation(YES), a determination is made as to whether or not the machine name had been used in the previous time (step S402). If the machine name has been used (ES), a determination is made as to whether or not the location where the setting file is stored (i.e., the location where the setting file is saved) is the computer 21 (step S403). This determination is made for reasons of esteeming the result of the processing performed in step S309, If the setting file is stored in the computer 21 (YES), the setting information saved in the storage medium 54 of the computer 21 is acquired (step S404), and the thus-acquired setting information is saved in the setting file of the computer 21 (S405).

In contrast, if the setting file is saved in the setting record section 79 (shown in FIG, 4) of the printer 23 (NO in step S403), the setting file is acquired from the setting record section 79 (step S406) and is stored in the setting file of the computer 21 (step S405), as in the case where the setting information is saved in the storage medium.

The processing flow is about a processing flow required when the setting file already exists. If in step S401 the computer 21 determines that the start-up of the computer 21 is not the first after installation of the program (NO) or if the machine name has never been used before (NO in step S402), the setting file per se does not exist. In such a case, the operating system (CPU 31) shown in FIG. 3 indicates on the CRT display 28 a message reading "Prepare a setting file" or "Perform the following settings through entry" (step S407). By way of the input device 53, the operator enters the required items such as the phone number of the facsimile, As a result, the setting file is prepared.

Figure 10:
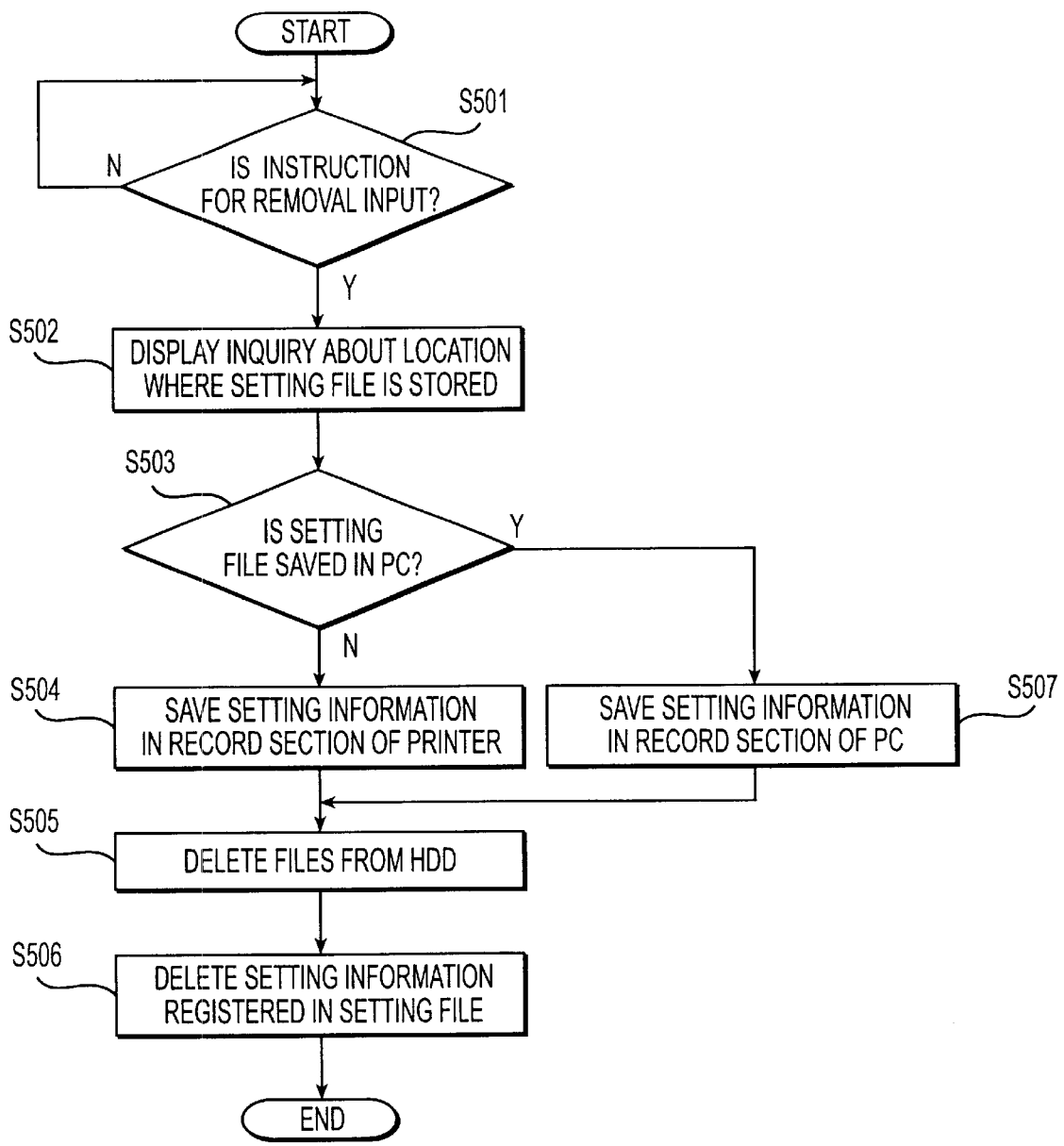
FIG. 10 is a flowchart showing the flow of processing required when the printer is removed from the computer.

FIG. 10 shows the flow of processing required when the printer is removed from the computer. As shown in FIG. 1, when the facsimile unit 25, serving as an external device, is connected to the printer 23 as a peripheral device, it is natural that the facsimile unit 25 be disconnected from the computer 21 as a result of disconnection. In a case where the user of the computer 21 does not use the printer 23 or the hybrid machine consisting of the printer 23 and the facsimile unit 25, the operator enters an instruction for disconnection by way of the input section 53 of the computer main unit 26. Upon receipt of the instruction (YES in step S501), the computer 21 indicates on the CRT display 28 (see FIG. 3) an indication for inquiring about the location where the setting information regarding the current machine name is stored (step S502). The user interface 72 shown in FIG. 4 has a display section. If the user enters an instruction by way of the user interface 72, an inquiry about the location where the setting information is stored may also be indicated on the display section of the user interface 72.

In the present embodiment, the setting information is stored somewhere in the computer 21 or the printer 23. In response to the inquiry, the user enters the storage location by way of the input device 53 shown in FIG. 3 or the user interface 72 shown in FIG. 4. Upon receipt of the thus-entered storage location, the computer 21 determines whether or not the storage location corresponds to a computer (PC) (step S503). If the storage location corresponds to the printer 23 (NO), the setting information is stored in the setting record section 79 (see FIG. 4) of the printer 23 (step S504). At this time, the setting information registered in the setting registration section 59 of the computer 21 is read, and the thus-read setting information is delivered to the interface 71 of the printer 23 from the interface 58 of the computer 21 by way of the extension cable 22. The setting information is written into the setting record section 79 from the interface 71 by way of the communications control section 75 and the setting registration control section 78. The writing of the setting information is based on the assumption that the printer 23 still remains connected to the computer 21. Therefore, in any other case, a request is made for connecting the printer 23 again to the computer 21 or the location where the setting information is stored is limited to the computer 21.

In this way, when the setting information is saved in the setting record section 79, there is no need to store the setting information in the hard disk drive (HDD) 43 (see FIG. 2). For this reason, the program file corresponding to the "machine name" stored in the hard disk drive 43 is deleted (step S505). Finally, a corresponding setting file is deleted from the computer 21 (step S506).

In contrast, if in step S503 the location where the setting information is saved is decided to be the computer 21, the setting information that has been used once is save in an area of the setting registration section 59 other than the location where the current setting information is registered (step S507). The CPU 31 proceeds to the processing in step S505, where the program file corresponding to the "machine name" is deleted (step S505), and the setting file corresponding to the program file is also deleted (step S506).

A second embodiment of the present invention will now be described. The computer 21 employed in the second embodiment is identical in configuration with that used in the previous embodiment. However, in the second embodiment, the computer 21 has a plurality of external devices which can be connected to the extension interface of the printer. Even if only the facsimile unit 25 is currently connected to the printer 23, another external device may be connected to the printer 23 in the future. Therefore, the printer 23 must be ready for future connection of another device.

Figure 11:
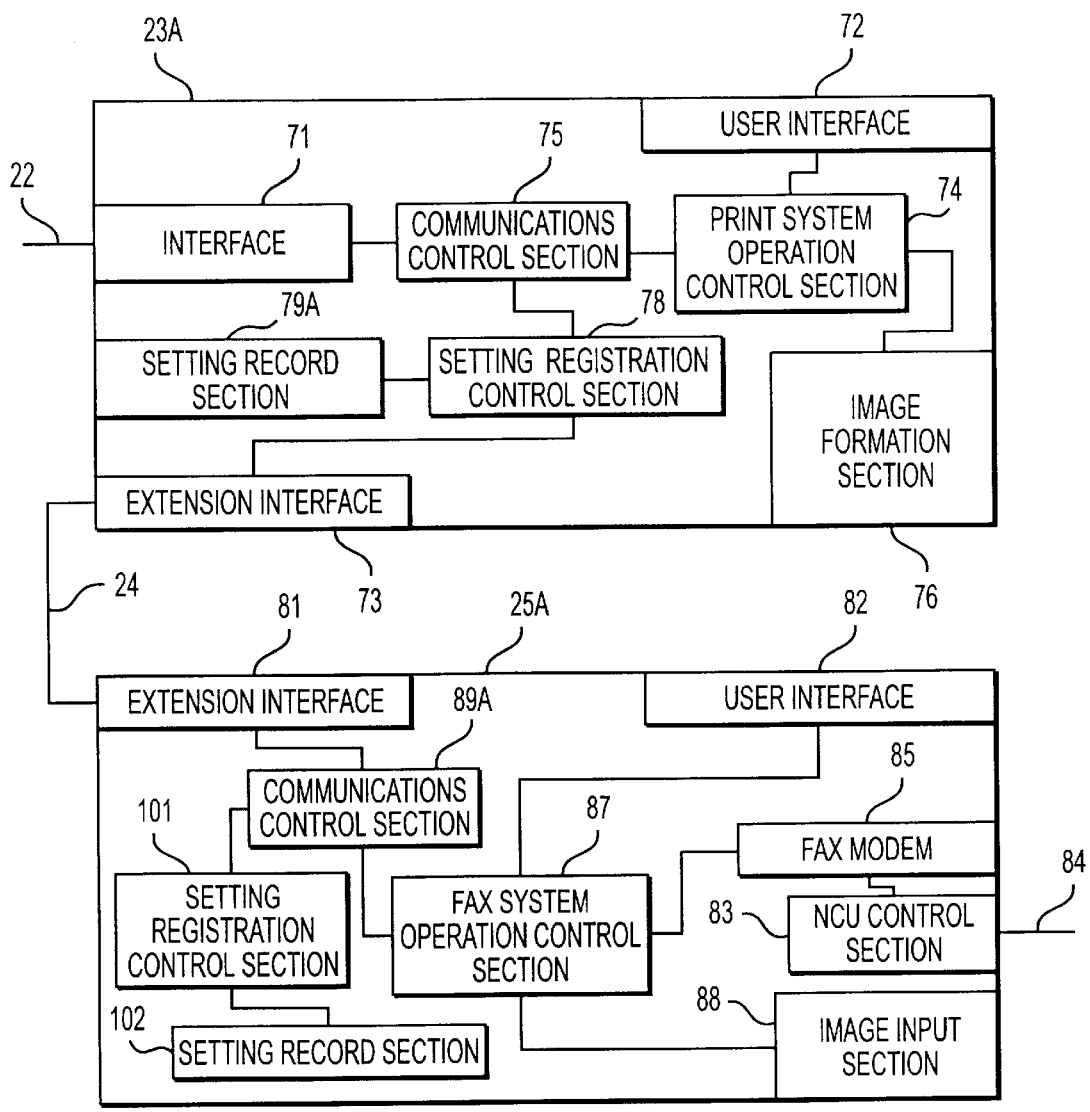
FIG. 11 is a block diagram showing the architecture of a printer and a facsimile unit according to a second embodiment of the present invention.

FIG. 11 shows the configuration of the printer and the facsimile unit according to the second embodiment. The elements which are the same as those of the previous embodiment shown in FIG. 4 are assigned the same reference numerals, and repetition of their explanations will be omitted. A printer 23A per se is identical with the printer 23, except in the following two points: namely, a plurality of possible external devices can be selectively connected to the extension interface 73 and a setting record section 79A can register a plurality of "hybrid machines" corresponding to the external devices connected to the interface 73. A communications control section 89A of the facsimile unit 25A is newly connected to the setting registration control section 101 connected to the setting record section 102.

Figure 12:
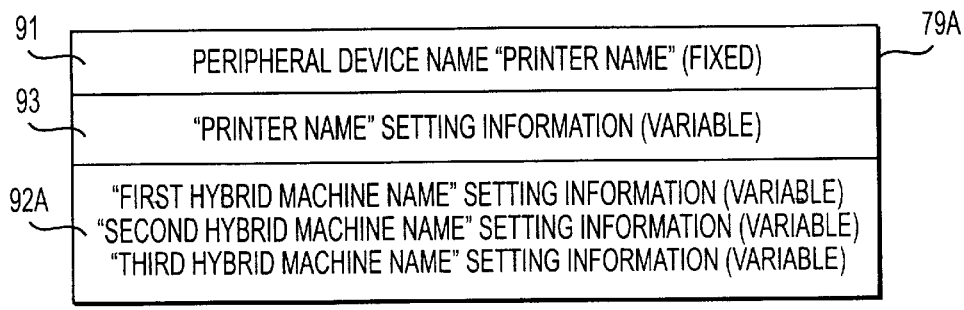
FIG. 12 is a table showing the configuration of a setting record section according to the second embodiment.

FIG. 12 shows the configuration of the setting record section according to the second embodiment, corresponding to that shown in FIG. 5. The setting record section 79A is formed from the foregoing nonvolatile memory location of RAM. The setting record section 79A is arranged so as to memorize "printer name" 91 as the name of the printer 23, "printer name setting information" 93 which can be set by the terminal, and "hybrid machine name setting information" 92A which can be set by way of the terminal when an external device is connected to the facsimile unit. For the "hybrid machine name setting information" 92A, any of a plurality of the setting information for "first hybrid machine name" and "second hybrid machine name" can be set and changed.

FIG. 13 shows the configuration of the setting record section of the facsimile unit 25A shown in FIG. 11. The setting record section 102 is formed from read-only memory, and "hybrid machine name" is fixedly stored in the setting record section 102 as a name for the time at which the facsimile unit 25A is connected to the printer 23. In a case where an external device other than the facsimile unit 25A is connected to the printer 23, a "hybrid machine name" defined by the relationship between the thus-connected external device and the printer 23 is registered in the setting record section 102.

In connection with the electronic device extension system according to such a second embodiment, an explanation will be first given of a case where the computer 21 is connected with the printer 23A. The control described in the previous embodiment by reference to FIG. 6 applies directly to the present case. In this case, however, the control differs from that according to the previous embodiment in that the "machine name" transmitted from the printer 23A in step S104 may be the machine name of the printer 23A or "hybrid machine name" defined by the status of connection between a plurality of external devices. Consequently, the contents of the setup disk requested in step S106 may differ according to the type of "hybrid machine."

FIG. 14 corresponds to FIG. 7 used for describing the previous embodiment and shows the processing performed by the printer when a request for machine name is made in step S103 shown in FIG. 6. Upon receipt of the request in step S103 (YES in step S211), the printer 23A shown in FIG. 11 checks whether or not the setting registration control section 78 shown in FIG. 11 is connected to the external device, such as a facsimile unit, by way of the extension interface 73 (step S212). In a case where the external device is connected to the printer (YES), the printer makes a request to the external device for setting machine name (step S213). As described by reference to FIG. 13, the setting record section 102 shown in FIG. 13 is fixedly holding the "hybrid machine name" for the time at which the external device is connected to the printer 23A. Consequently, when the printer 28A makes a request for setting machine name by way of the extension cable 24, the facsimile unit 25A, for instance, connected to the printer 23A in the current modification, transmits the "hybrid machine name" to the printer 23A by way of the extension cable 24.

Upon receipt of the "hybrid machine name" as machine name (YES in step S214), the printer 23A transfers the thus-received hybrid machine name to the computer 21 (step S215). As a result, the computer 21 can determine what kind of external device is connected to the printer 23A as a peripheral device, In contrast, if in step S212 the computer 21 determines that no external device is connected to the printer 23A (NO), the printer 23A transmits the "printer name" thereof to the computer 21 (step S216).

The control required at the time of disconnection of the printer 23A serving as a peripheral device from the computer 21 serving as an electronic device in the previous second embodiment is completely identical that required for the processing performed in the previous embodiment shown in FIG. 10. Therefore, repeated explanation of the processing will be omitted.

A third embodiment of the present invention will now be described. The computer 21 used in the third embodiment is identical in configuration with that employed in the second embodiment. In the embodiment and the second embodiment, when the location where the "printer name" and the "hybrid machine name setting information" is stored is specified as the "printer," the setting information are stored in the storage section of the printer 23 (or 23A). In a case where a plurality of types of external devices can be connected to the printer 23A, as in the case of the second embodiment, three or more settings, such as "first hybrid machine name," "second hybrid machine name," "third hybrid machine name," . . . are stored in addition to the "printer name." Accordingly, the printer 23A is required to have sufficient storage capacity for storing these settings. As a matter of course, even when the printer 23A has storage capacity less than this, a certain number of settings may be registered in the printer 23A. However, if the user changes the external devices one after another, there will be required processing for eliminating the information already set in the storage section from a certain point in time.

For this reason, the third embodiment is based on the assumption that external devices typified by the facsimile unit are connected to the printer. Each of the external devices is provided with a storage section, and each external device performs the setting by itself. Accordingly, the printer is required to store only the setting regarding the printer itself. As a result, the printer is required to ensure only storage capacity needed for writing setting information regarding the printer itself.

In the electronic device extension system according to the third embodiment, when setting data are acquired from the hybrid machine and registered, the setting information regarding the printer is input to the setting registration section of the computer from the storage section of the printer by way of the interface. Further, setting information regarding the external device, such as a facsimile unit, is entered and registered into the setting registration section of the computer from the storage section of the external device by way of the extension interface and the interface of the printer.

In contrast, in a case where the setting data stored in the computer are copied to the hybrid machine, if the setting data are setting information regarding the printer, the setting data are registered in the storage section of the printer by way of the interface. If the setting data are setting information regarding the external device, such as a facsimile unit, the setting data will be registered in the storage section of the external device by way of the interface and the extension interface of the printer.

Figure 15:
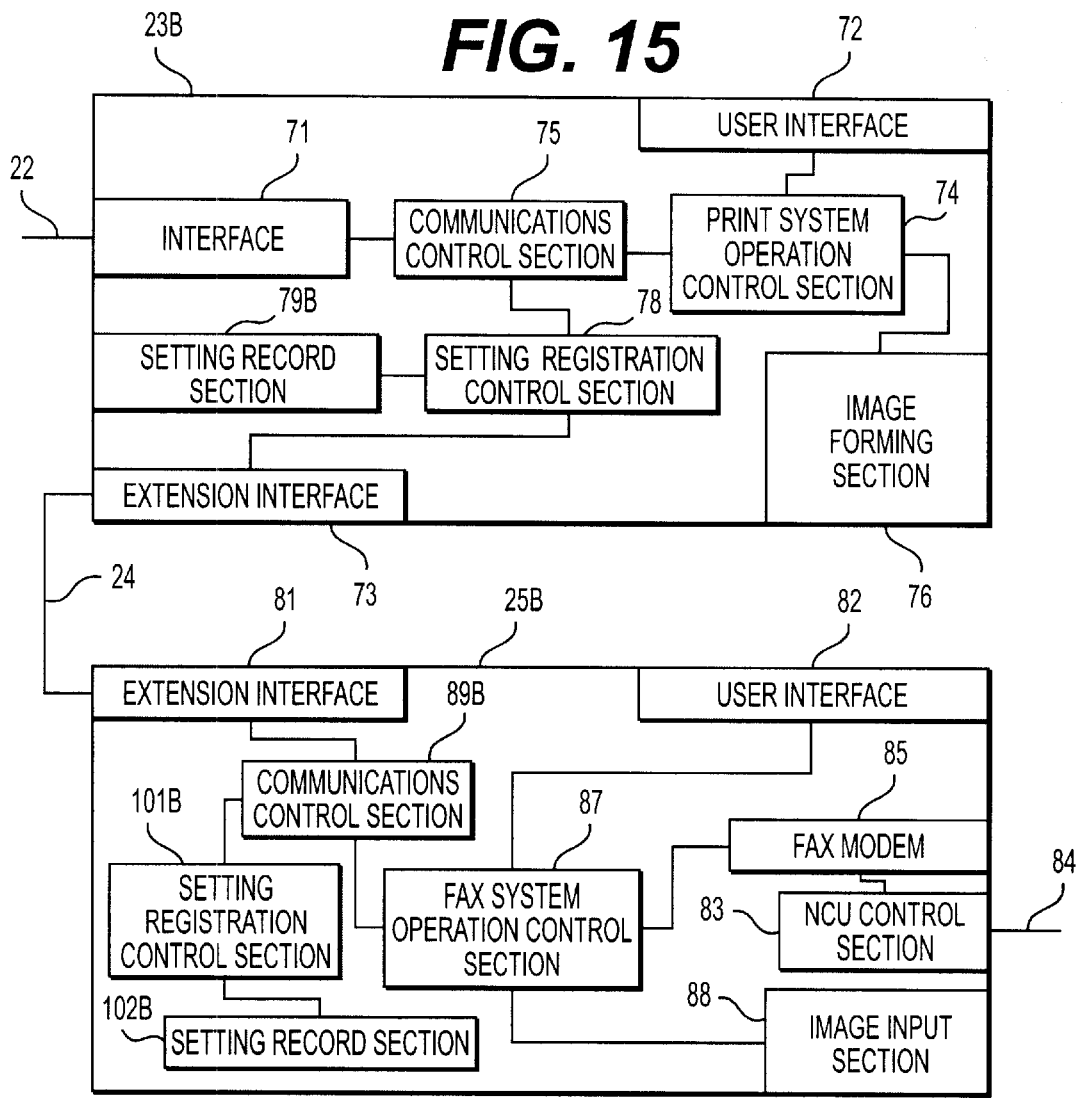
FIG. 15 is a block diagram showing the architecture of a printer and a facsimile unit according to a third embodiment of the present invention.

FIG. 15 shows the configuration of the printer and the facsimile unit according to the third embodiment, Those elements which are the same as those of the previous embodiment shown in FIG. 4 are assigned the same reference numerals, and repetition of their explanations will be omitted. A printer 23B per se is identical with the printer 23, except for the following two points: namely, a plurality of possible external devices can be connected to the extension interface 73, and a setting record section 79B can register a "hybrid machine setting information." A communications control section 89B of a facsimile unit 25B is connected to a setting registration control section 101B connected to a setting record section 102B.

Figure 16:
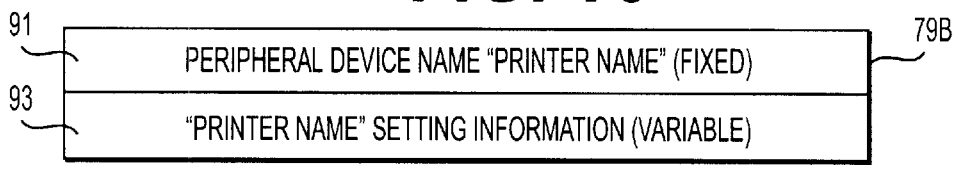
FIG. 16 is a table showing the configuration of a setting record section according to the third embodiment.

FIG. 16 shows the configuration of the setting record section according to the third embodiment, corresponding to that according to the embodiment shown in FIG. 5 and that according to the second embodiment shown in FIG. 12. The setting record section 79B is formed from the foregoing nonvolatile memory location of RAM. The setting record section 79B comprises "printer name" 91 as the name of the printer 23 and "printer name setting information" 93 which can be set by the terminal. The setting record section 79B is arranged so as not to be able to register "hybrid machine name setting information" as a name for the time during which the external device is connected to the printer.

Figure 17:
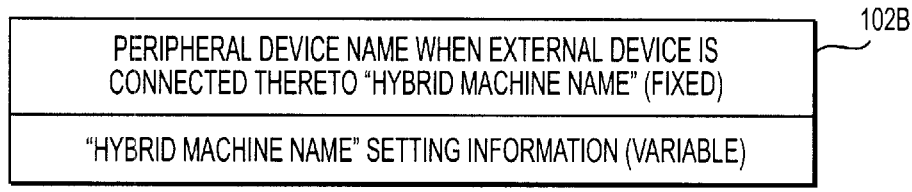
FIG. 17 is a chart showing the configuration of the setting record section of a facsimile unit according to the third embodiment.

FIG. 17 shows the configuration of the setting record section of the facsimile unit 25B shown in FIG. 15. The setting record section 102B is formed from the previously described nonvolatile memory, and "hybrid machine name" is fixedly stored in the setting record section 102B as a name for the time during which the facsimile unit 25B is connected to the printer 23. In a case where an external device other than the facsimile unit 258 is connected to the printer 23, a "hybrid machine name" defined by the relationship between the thus-connected external device and the printer 23 is registered in the setting record section 102B.

In connection with the electronic device extension system according to such a third embodiment, an explanation will be first given of a case where the computer 21 is connected with the printer 23B. The control described in the previous embodiment by reference to FIG. 6 applies directly to the present case. In this case, however, the control differs from that according to the previous embodiment in that the "machine name" transmitted from the printer 23B in step S104 may be the machine name of the printer 23B or "hybrid machine name" defined by the status of connection between a plurality of external devices. Consequently, the contents of the setup disk requested in step S106 may differ according to the type of "hybrid machine," as in the case of the second embodiment. When a request for machine name is made, the processing performed by the printer in step 103 is completely identical with the processing according to the second embodiment shown in FIG. 14. Hence, repetition of its explanation will be omitted here.

In connection with the third embodiment, an explanation will be given of the control required at the time of disconnection of the printer 233 from the computer 21.

Figure 18:
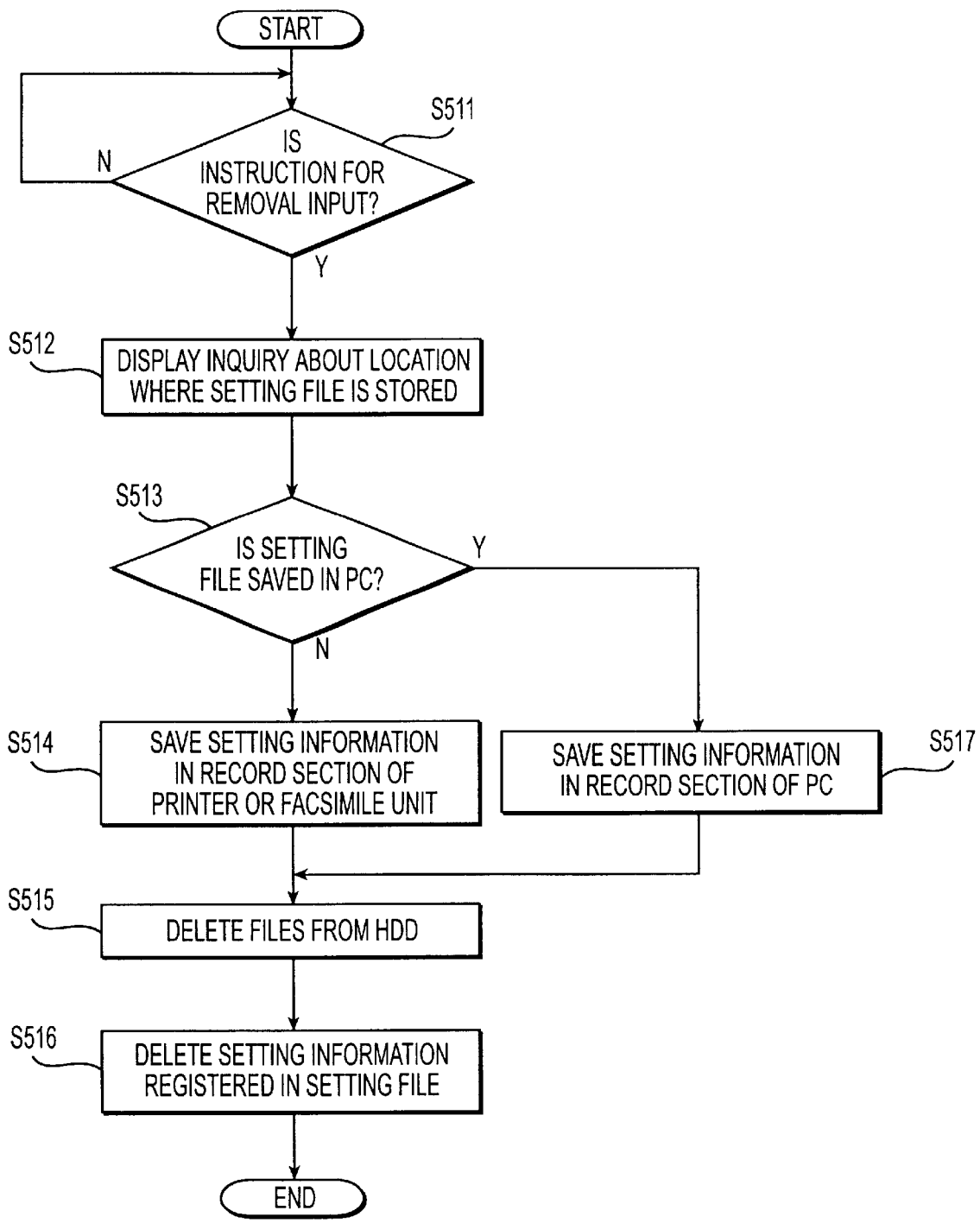
FIG. 18 is a flowchart showing the processing performed by the printer at the time of disconnection of a printer from a computer.

FIG. 18 shows the processing performed by the printer at the time of disconnection of a printer from a computer. When the user of the computer 21 does not use the printer 23B or the hybrid machine comprising the printer 23B and the facsimile unit 25B, the operator enters an instruction for disconnection by way of the input section 53 of the computer main unit 26. Upon receipt of the instruction (YES in step S511), the computer 21 indicates on the CRT display 28 (see FIG. 3) an indication for inquiring about the location where the setting information regarding the current machine name is stored (step S512). The user interface 72 shown in FIG. 4 has a display section, If the user enters an instruction by way of the user interface 72, an inquiry about the location where the setting information is stored may also be indicated on the display section of the user interface 72.

In the third embodiment, the setting information is stored somewhere in the computer 21 or the printer 23B. In response to the inquiry, the user enters the storage location by way of the input device 53 shown in FIG. 3 or the user interface 72 shown in FIG. 4. Upon receipt of the thus-entered storage location, the computer 21 determines whether or not the storage location corresponds to a computer (PC) (step S513). If the storage location corresponds to the printer 23B or the facsimile unit 25B (NO), the setting information is stored in a setting record section 79B (see FIG. 16) of the printer 23B or the facsimile unit 25B, or in the setting record section 102B of any of the external devices(see FIG. 17) (step S514). More specifically, in a case where an external device is not connected to the printer 23B and where the printer 2313 is disconnected from the computer 21, the setting information is stored in the setting record section 79B. In a case where the printer 23B is disconnected from the computer 21 while the external device, such as the facsimile unit 25B, is connected to the printer 23B, the setting information is saved in the setting record section of the external device, such as the setting record section 102B of the facsimile unit 25B.

At this time, the setting information registered in the setting registration section 59 of the computer 21 is read, and the thus-read setting information reaches the interface 71 of the printer 23 from the interface 58 of the computer 21 by way of the extension cable 22. The setting information is written into the setting record section 79B from the interface 71 by way of the communications control section 75 and the setting registration control section 78; otherwise, in the present embodiment, the setting information further reaches the extension interface 81 of the facsimile unit 25B from the setting registration control section 78 by way of the extension interface 73. The setting information is then written into the setting record section 102B by way of the communications control section 89B and the setting registration control section 101B. As a matter of course, the writing of the setting information is based on the assumption that the printer 23B still remains connected to the computer 21. Therefore, in any other case, a request is made for connecting the printer 23B again to the computer 21 or the location where the setting information is stored is limited to the computer 21. Similar processing applies to a case where the facsimile unit 25B is connected to the printer 23B and where the facsimile unit 25B is removed from the printer 23B before disconnection of the printer 23B from the computer 21.

In this way, after the setting information has been saved in the setting record section 79B of the printer 23B or the facsimile unit 25B, or in the setting record section 102B of the facsimile unit 25B, there is no need to store the setting information in the hard disk drive (HDD) 43 (see FIG. 2) of the computer 21. For this reason, the program file corresponding to the "machine name" stored in the hard disk drive 43 is deleted (step S515). Finally, a corresponding setting file is deleted from the computer 21 (step S516).

In contrast, if the location where the setting information is saved is determined to be the computer 21 in step S513, the setting information that has been used once is save in an area of the setting registration section 59 other than the location where the current setting information is registered (step S517). The CPU 31 proceeds to the processing in step S515, where the program file corresponding to the "machine name" is deleted (step S515), and the setting file corresponding to the program file is also deleted (step S516).

Figure 19:
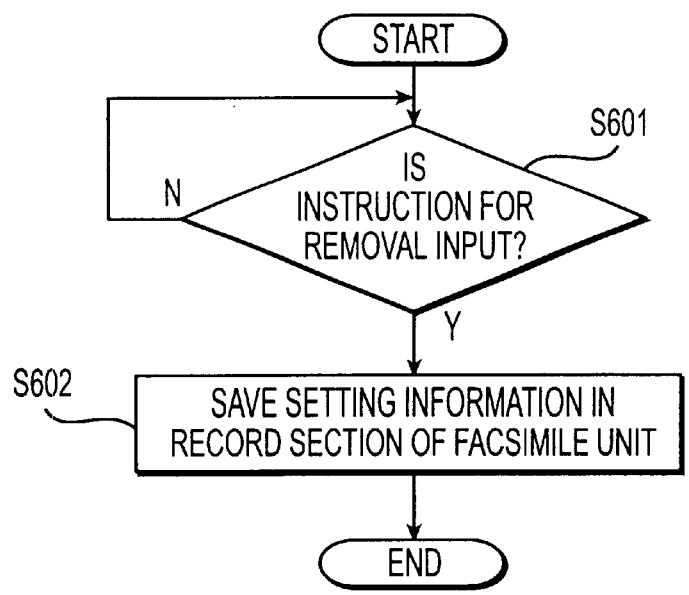
FIG. 19 is a flowchart showing the flow of processing performed by the printer when a request is made to the printer for removing the facsimile unit serving as an external device.
Figure 20:
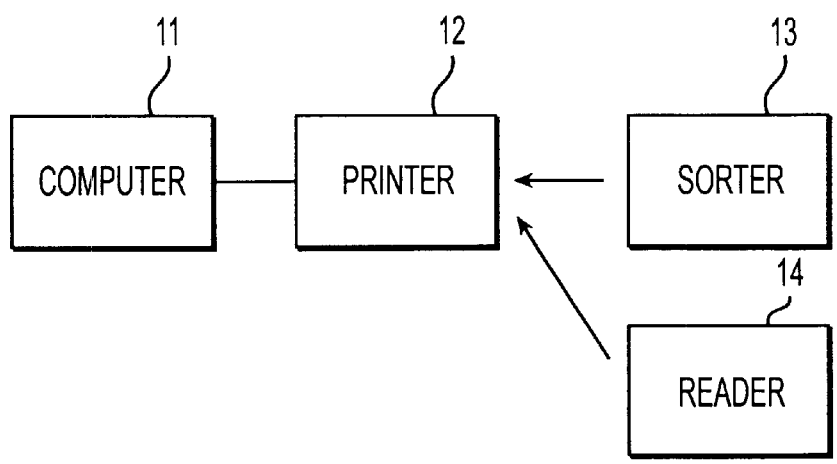
FIG. 20 is a block diagram showing one example of a related electronic device extension system.

FIG. 19 shows the flow of processing performed by the printer when a request is made to the printer for removing the facsimile unit serving as an external device. In a case where the facsimile unit 25B of the hybrid machine comprising the printer 23B and the facsimile unit 25B is not used, the user can make an instruction for removing the facsimile unit 25B from the user interface 82 (see FIG. 15) of the printer 23B. Upon receipt of the instruction (YES in step S601), the printer 23B cannot store the setting information regarding the facsimile unit 25B into the setting record section 79B of the printer 23B. Therefore, the setting information is immediately saved in the setting record section 102B of the facsimile unit 25B connected to the printer 23B (step S602). In this case, in contrast with the control shown in FIG. 18, the control required in this case does not require elimination of unneeded files from the hard disk drive of the computer 21, and the disconnection processing is terminated at this point in time (END). In a case where only the printer is connected to the computer or another extension unit is connected to the printer, the disconnection processing will be followed by the processing steps provided in FIGS. 6 through 8.

Although the embodiment and the modifications thereof have been described with reference to the case where the printer is connected to the computer, any type of computer may be used as the computer serving as an electronic device, As a matter of course, the electronic device is not limited to a computer into which Microsoft Windows can be installed. Further, naturally the peripheral device is not limited to a printer. Any type of device can be used as a peripheral device; the only essential requirement is that the device may be connected to the electronic device as an input or output device. A modem board or expandable keyboard attached so as to extend the features of the electronic device main unit is certainly included in the peripheral device. Further, the external device is not limited to the facsimile unit; any type of device may be employed as an external device, so long as it is intended to extend the features of the peripheral device or the electronic device.

Although the floppy disk or a hard disk drive has been described as a recording medium for the purpose of storing programs in the previous embodiment, the recording medium is not limited to these. Particularly, other various types of recording mediums have recently come into use. For instance, a program stored in CD-ROM, CDR, or CDRW or a program stored in DVD is naturally also applicable to the present invention. It has become common that an electronic device, such as a computer, is connected to a network such as the Internet. It is naturally assumed that a program may be installed in the electronic device by way of the network.

As has been described above, according to the present invention, an electronic device, for example, makes a request to a peripheral device connected thereto for sending an identification name corresponding to the features of the peripheral device, and the peripheral device voluntarily notifies the electronic device of an identification name corresponding to the features of the peripheral device after having been connected to the electronic device. Contrasted with a related electronic device which makes a request for the original identification name of the peripheral device, the electronic device acquires an identification name corresponding to the features of the peripheral device, thus being able to take measures corresponding to the features.

Accordingly, smooth cooperation between the electronic device and the peripheral device can be ensured. Further, according to the present invention, if the electronic device does not include any program corresponding to the identification name acquired from the peripheral device, the electronic device can immediately make a request for the program. Even in a case where a unique program is required as a result of an external device being connected to the peripheral device, there can be prevented a failure, which would otherwise be caused as a result of the electronic device performing data processing without being aware of the program.

Further, according to the present invention, since the peripheral device notifies the electronic device of an identification name corresponding to the features of the peripheral device in response to the request for an identification name from the electronic device, the peripheral device can focus its performance on the processing of data regarding the peripheral device per se until it receives a request from the electronic device.

According to the present invention, a peripheral device notifies an electronic device connected to the peripheral device of an identification name corresponding to the features of the peripheral device or the features of an external device connected to the peripheral device. In other words, contrasted with a related electronic device which makes a request for the original identification name of the peripheral device, the electronic device requests to acquire an identification name corresponding to the features of the peripheral device or the peripheral device voluntarily notifies the electronic device of the identification name after having been connected to the electronic device, thus being able to take measures corresponding to the features.

Accordingly, smooth cooperation between the electronic device and the peripheral device or cooperation among the electronic device, the peripheral device, and the external device can be ensured. Further, according to the present invention, if the electronic device does not include any program corresponding to the identification name acquired from the peripheral device, the electronic device can immediately make a request for the program. Even in a case where a unique program is required as a result of an external device being connected to the peripheral device, there can be prevented a failure, which would otherwise be caused as a result of the electronic device performing data processing without being aware of the program.

According to the present invention, the peripheral device notifies the electronic device of an identification name corresponding to the features of the peripheral device in response to the request for an identification name from the electronic device. Accordingly, the peripheral device can focus its performance on the processing of data regarding the peripheral device per se until it receives a request from the electronic device.

According to the present invention, when an external device is connected to the peripheral device, the peripheral device changes its original identification name to a hybrid identification name corresponding to the features extended as a result of connection of the external device to the peripheral device. When no external device is connected to the peripheral device, current identification name storage means of the peripheral device reassumes the original identification name of the peripheral device.

Consequently, if an external device is newly connected to the peripheral device, the connection of the peripheral device is changed, or the external device is disconnected from the peripheral device to thereby bring the peripheral device into its original configuration, the identification name of the peripheral device may be changed to another identification name corresponding to the change.

Therefore, for example, when the electronic device makes a request to the peripheral device for an identification name or when the electronic device is connected to the peripheral device, the peripheral device notifies the electronic device of the currently-set identification name. Thus, it is not necessary for the peripheral device to interrupt the data processing that the peripheral device is executing and to establish communication with the external device at a point in time the request is made.

Further, the peripheral device can grasp the state of connection between the peripheral device and an external device at all times, thus enabling constantly smooth cooperation between the peripheral device and the external device.

According to the present invention, the electronic extension system may further comprise: disconnection notice input means for sending previous notice data before the peripheral device is disconnected from the electronic device or the external device is disconnected from the peripheral device; and setting information storage means which stores setting information about the peripheral device or the external device in the electronic device, the peripheral device, or the external device when the previous notice data are received from the disconnection notice input means.

By use of the foregoing configuration, the setting information regarding the peripheral device is saved in the electronic device, the peripheral device, or the external device at the time of disconnection of the peripheral device from the electronic device. When such a device is again connected to the electronic device, the efforts required for again preparing the setting information can be prevented.

According to the present invention, the electronic extension system may further comprise: storage address inquiry means for making an inquiry about a location where the setting information is stored by the setting information storage means; and storage address designation means for storing the setting information in response to an answer to the inquiry from the storage address inquiry means. The user can save the setting information in the most convenient location in consideration of future combination of devices.

According to the present invention, the electronic device extension system may further comprise: unneeded program elimination means that, when the setting information storage control means stores setting information, deletes from the electronic device only the program regarding the peripheral device or the external device that is stored in the electronic device in response to the setting information. Failures, which would be caused by coexistence of unneeded programs within the electronic device, can be reduced, thereby contributing to a reduction in the storage capacity for storing programs.

According to the present invention, the electronic device extension system may further comprise designated program elimination disable means which excludes from programs which are to be deleted by the unneeded program disconnection means a program for implementing the original function of the peripheral device that is a predetermined device. At the time of connection of a so-called plug-and-play peripheral device to the electronic device, even if the peripheral device has been removed from the electronic device once, the peripheral device can be started without a need to newly install a program.

According to the present invention, the electronic device extension system may further comprise: file collation means for collating, against the files that are already installed in the electronic device, files of a program to be installed in the electronic device when the peripheral device is connected to the electronic device of the system or when an external device is connected to the peripheral device; and file installation means for installing into the electronic device only those files whose corresponding files are not found. Only those files whose corresponding files are not found are installed in the electronic device, thereby shortening the time to install a program and the overall storage capacity required for storing programs.

What is claimed is:

1. An electronic device extension system comprising:

an electronic device;

a peripheral device connected to the electronic device;

at least one external device capable of connecting to the peripheral device for a feature extension of the peripheral device;

storage means provided in the electronic device for storing a program required at the time of connection of the peripheral device;

device connection means provided in the electronic device for connecting the peripheral device thereto;

identification name acquisition means provided in the electronic device for acquiring an identification name corresponding to a feature of the peripheral device from the peripheral device via the device connection means;

determination means provided in the electronic device for determining whether the program corresponding to the identification name acquired by the identification name acquisition means is stored in the storage means;

program storage means provided in the electronic device for storing the program when the determination means determines that the corresponding program is unstored in the storage means;

connection means provided in the peripheral device for connecting with the device connection means of the electronic device;

feature extension connection means provided in the peripheral device for connecting with the external device;

identification name setting means provided in the peripheral device for setting an identification name in response to the connection of the external device; and identification name notification means provided in the peripheral device and connected to the electronic device through the connection means for notifying the electronic device of an identification name corresponding to the feature extension of the peripheral device.

2. The electronic device extension system as set forth in claim 1, wherein the identification name setting means includes current identification name storage means for storing an original identification name of the peripheral device when the external device is disconnected, and for storing a hybrid identification name corresponding to the feature extension of the peripheral device when the external device is connected thereto.

3. The electronic device extension system as set forth in claim 2 further comprising:

disconnection notice input means for inputting notice data to notice a disconnection previously when at least one of the disconnection of the peripheral device from the electronic device and the disconnection of the external device from the peripheral device is executed; and setting information storage means for storing setting information of the peripheral device and the external device in one of the electronic device, the peripheral device and the external device when the notice data is input by the disconnection notice input means.

4. The electronic device extension system as set forth in claim 3 further comprising:

storage address inquiry means for making an inquiry about a location where the setting information is stored by the setting information storage means; and storage address designation means for storing the setting information in response to an answer to the inquiry from the storage address inquiry means.

5. The electronic device extension system as set forth in claim 3 further comprising:

unneeded program elimination means for deleting the program regarding only the peripheral device and the external device stored in the storage means of the electronic device in accordance with the storing operation by the setting information storage means.

6. The electronic device extension system as set forth in claim 5 further comprising:

designated program elimination disable means for excluding from programs which are to be deleted by the unneeded program disconnection means a program for implementing the original feature of the peripheral device when the peripheral device is a device designated previously.

7. The electronic device extension system as set forth in claim 2 further comprising:

file collation means for collating files of the program to be installed in the electronic device with the files installed in the electronic device when one of the connection of the peripheral device to the electronic device and the connection of the external device to the peripheral device is executed; and file installation means for installing into the electronic device only files being out of accord concluded by the collation.

8. The electronic device extension system as set forth in claim 1 further comprising:

disconnection notice input means for inputting notice data to notice a disconnection previously when at least one of the disconnection of the peripheral device from the electronic device and the disconnection of the external device from the peripheral device is executed; and setting information storage means for storing setting information of the peripheral device and the external device in one of the electronic device, the peripheral device and the external device when the notice data is input by the disconnection notice input means.

9. The electronic device extension system as set forth in claim 8 further comprising:

storage address inquiry means for making an inquiry about a location where the setting information is stored by the setting information storage means; and storage address designation means for storing the setting information in response to an answer to the inquiry from the storage address inquiry means.

10. The electronic device extension system as set forth in claim 8 further comprising:

unneeded program elimination means for deleting the program regarding only the peripheral device and the external device stored in the storage means of the electronic device in accordance with the storing operation by the setting information storage means.

11. The electronic device extension system as set forth in claim 10 further comprising:

designated program elimination disable means for excluding from programs which are to be deleted by the unneeded program disconnection means a program for implementing the original feature of the peripheral device when the peripheral device is a device designated previously.

12. The electronic device extension system as set forth in claim 1 further comprising;

file collation means for collating files of the program to be installed in the electronic device with the files installed in the electronic device when one of the connection of the peripheral device to the electronic device and the connection of the external device to the peripheral device is executed; and file installation means for installing into the electronic device only files being out of accord concluded by the collation.

* * * * *